(12) United States Patent
Fischell et al.

(10) Patent No.: US 12,174,285 B2
(45) Date of Patent: Dec. 24, 2024

(54) SINGLE-RECEIVER DOPPLER-BASED SOUND SOURCE LOCALIZATION TO TRACK UNDERWATER TARGET

(71) Applicant: Woods Hole Oceanographic Institution, Woods Hole, MA (US)

(72) Inventors: Erin Fischell, Woods Hole, MA (US); Peter Traykovski, Woods Hole, MA (US)

(73) Assignee: WOODS HOLE OCEANOGRAPHIC INSTITUTION, Woods Hole, MA (US)

( * ) Notice: Subject to any disclaimer, the term of this patent is extended or adjusted under 35 U.S.C. 154(b) by 67 days.

(21) Appl. No.: 18/025,869

(22) PCT Filed: Sep. 14, 2021

(86) PCT No.: PCT/US2021/050246
§ 371 (c)(1),
(2) Date: Mar. 10, 2023

(87) PCT Pub. No.: WO2022/060720
PCT Pub. Date: Mar. 24, 2022

(65) Prior Publication Data
US 2023/0341507 A1    Oct. 26, 2023

Related U.S. Application Data

(60) Provisional application No. 63/078,978, filed on Sep. 16, 2020.

(51) Int. Cl.
*G01S 13/00* (2006.01)
*G01S 5/18* (2006.01)
*G01S 13/90* (2006.01)

(52) U.S. Cl.
CPC ............... *G01S 13/00* (2013.01); *G01S 5/18* (2013.01); *G01S 13/90* (2013.01)

(58) Field of Classification Search
CPC .......... G01S 11/12; G01S 13/90; G01S 15/89; G01S 17/89; G01S 17/895; G01P 3/38; G01B 3/68; H04R 3/00
See application file for complete search history.

(56) References Cited

U.S. PATENT DOCUMENTS

| 5,119,341 A | 6/1992 | Youngberg ........... G01S 5/0009 367/5 |
| 5,877,998 A | 3/1999 | Aidala ..................... G01S 5/18 367/124 |

(Continued)

OTHER PUBLICATIONS

Eustice, Ryan M. et al.,Synchronous-Clock, One-Way-Travel-Time Acoustic Navigation for Underwater Vehicles, J. Field Robotics, 2010, pp. 121-136, vol. 28(1), Wiley Periodicals, Inc.

(Continued)

*Primary Examiner* — Van T Trieu
(74) *Attorney, Agent, or Firm* — Douglas Denninger; Cristy Salanga

(57) ABSTRACT

A system, method, and computer readable medium having a tracked package with a source emitting signals through an underwater environment that are detected by a receiver on a tracker and thereby producing a received signal, the tracker also having a controller and a position mechanism. The controller is configured to produce a sample from the received signal, receive velocity data from the position mechanism, and determine an angle relative to the source by comparing the received signal's frequency from a known source frequency and the velocity data.

20 Claims, 8 Drawing Sheets

(56) References Cited

U.S. PATENT DOCUMENTS

| | | | |
|---|---|---|---|
| 5,894,450 A | 4/1999 | Schmidt et al. | |
| 6,867,731 B2 | 3/2005 | Dizaji | G01S 7/292 |
| | | | 342/159 |
| 7,139,647 B2 | 11/2006 | Larsen | |
| 7,760,587 B2 | 7/2010 | Abbot | G01S 15/876 |
| | | | 367/131 |
| 7,859,944 B2 | 12/2010 | Zhou et al. | |
| 7,953,326 B2 | 5/2011 | Farr | H04B 13/02 |
| | | | 398/104 |
| 8,018,794 B2 | 9/2011 | Thierry | G01S 5/18 |
| | | | 367/120 |
| 8,403,105 B2 | 3/2013 | Lee | G01S 5/22 |
| | | | 181/125 |
| 8,670,293 B2 | 3/2014 | Morozov | H04B 11/00 |
| | | | 367/176 |
| 8,767,511 B2 | 7/2014 | Pennec | G01S 15/74 |
| | | | 367/128 |
| 8,842,498 B2 | 9/2014 | Cahalan | G01S 3/808 |
| | | | 367/134 |
| 8,908,475 B2 | 12/2014 | Napolitano | G01S 1/807 |
| | | | 367/125 |
| 8,953,944 B2 | 2/2015 | Machado | H04B 13/02 |
| | | | 398/104 |
| 9,231,708 B2 | 1/2016 | Farr | H04B 13/02 |
| 9,294,201 B2 | 3/2016 | Farr | H04B 13/02 |
| 9,444,556 B1 | 9/2016 | Cahalan | G01S 3/808 |
| 9,503,202 B2 | 11/2016 | Cahalan | H04B 13/02 |
| 9,681,220 B2 | 6/2017 | Delikaris-Manias | H04R 1/08 |
| 9,689,958 B1 | 6/2017 | Wild | G01S 3/802 |
| 10,183,732 B2 | 1/2019 | Celikkol | G01C 21/20 |
| 10,184,797 B2 | 1/2019 | Georgy | G01C 21/165 |
| 2005/0219950 A1 | 10/2005 | Rowe | G01S 5/0226 |
| | | | 367/118 |
| 2008/0165617 A1 | 7/2008 | Abbot | |
| 2008/0239874 A1 | 10/2008 | Kemp et al. | |
| 2009/0216444 A1 | 8/2009 | Crowell | G01S 19/14 |
| | | | 701/469 |
| 2011/0038230 A1 | 2/2011 | Napolitano | G01S 5/26 |
| | | | 367/127 |
| 2011/0141853 A1 | 6/2011 | Megdal | G01S 5/30 |
| | | | 367/117 |
| 2011/0273958 A1 | 11/2011 | Xia | G01V 1/3817 |
| | | | 367/21 |
| 2011/0279366 A1 | 11/2011 | Lohbihler | H01H 13/88 |
| | | | 345/157 |
| 2013/0006574 A1 | 1/2013 | Nicholson | G06T 7/277 |
| | | | 702/142 |
| 2013/0308790 A1* | 11/2013 | Claussen | H04R 3/00 |
| | | | 381/92 |
| 2013/0335270 A1 | 12/2013 | Edelmann | G10K 11/341 |
| | | | 342/372 |
| 2014/0104108 A1 | 4/2014 | Holford et al. | |
| 2014/0248058 A1 | 9/2014 | Simpson | H04B 10/112 |
| | | | 398/104 |
| 2014/0269201 A1 | 9/2014 | Liu | H04B 11/00 |
| | | | 367/131 |
| 2015/0285833 A1* | 10/2015 | Ruffier | G01P 3/38 |
| | | | 356/28 |
| 2016/0071526 A1 | 3/2016 | Wingate | G01S 3/802 |
| | | | 704/233 |
| 2016/0127042 A1 | 5/2016 | Farr | H04B 10/11 |
| | | | 398/104 |
| 2016/0161589 A1 | 6/2016 | Benattar | G01S 3/803 |
| | | | 367/129 |
| 2016/0227298 A1 | 8/2016 | White | H04L 7/0041 |
| 2016/0334793 A1 | 11/2016 | Celikkol | G05D 1/0875 |
| 2016/0355247 A1 | 12/2016 | Ibn Seddik | |
| 2017/0176188 A1 | 6/2017 | Georgy | H04W 72/042 |
| 2017/0227638 A1 | 8/2017 | Nicoletti | G01S 15/89 |
| 2017/0317765 A1 | 11/2017 | Morris | H04L 1/0001 |
| 2017/0332156 A1 | 11/2017 | White | H04L 7/0008 |
| 2018/0145770 A1 | 5/2018 | Oelze | H04B 13/005 |
| 2019/0007195 A1 | 1/2019 | Udovydchenkov | G01V 1/3852 |
| 2019/0129026 A1* | 5/2019 | Sumi | G01S 7/52033 |
| 2019/0204430 A1 | 7/2019 | Schmidt | |
| 2022/0221579 A1 | 7/2022 | Fischell et al. | |
| 2022/0236437 A1 | 7/2022 | Van Vossen | |

OTHER PUBLICATIONS

Kepper, James H., IV, MEMS IMU Navigation with Model Based Dead-Reckoning and One-Way-Travel-Time Acoustic Range Measurements for Autonomous Underwater Vehicles, Masters Thesis, Sep. 2017, Mass. Inst. Technology & Woods Hole Oceanographic Inst.

Jakuba, M.V. et al., Feasibility of Low-Power One-Way Travel-Time Inverted Ultra-Short Baseline Navigation, OCEANS 2015, pp. 1-10, Proc. IEEE/MTS Washington, doi: 10.23919/OCEANS.2015.7401992.

Viquez, O.A. et al., Design of a General Autonomy Payload for Low-Cost AUV R&D, 2016 IEEE/OES Autonomous Underwater Vehicles (AUV), 2016, pp. 151-155, doi: 10.1109/AUV.2016.7778663.

Fischell, N.R. et al., Relative Acoustic Navigation for Sensing with Low-Cost AUVs 2016 ICRA.

J. Collins, D.R. McGaughey, J.A. Theriault, and S. Pecknold "Torpedo Detection using Multi-path Signals and Fast Orthogonal Search Techniques", Apr. 2005, The Journal of the Acoustical Society of America 117(4) DOI:10.1121/1.4776851.

S. A. Moore, J. Le Coz, D. Hurther, A. Paquier, "Using multi-frequency acoustic attenuation to monitor grain size and concentration of suspended sediment in rivers" The Journal of the Acoustical Society of America 133, 1959 (2013); doi: 10.1121/1.4792645.

Perry Naughton, Philippe Roux, Curt Schurgers, Ryan Kastner, Jules S. Jaffe, and Paul L. D. Roberts, "Self-localization of a mobile swarm using noise correlations with local sources of opportunity" The Journal of the Acoustical Society of America 144, 2811 (2018); doi: 10.1121/1.5070154.

* cited by examiner $$\cos(\theta_{rel}) = \frac{f_r/f_a - c}{|\vec{v}_r|}.$$

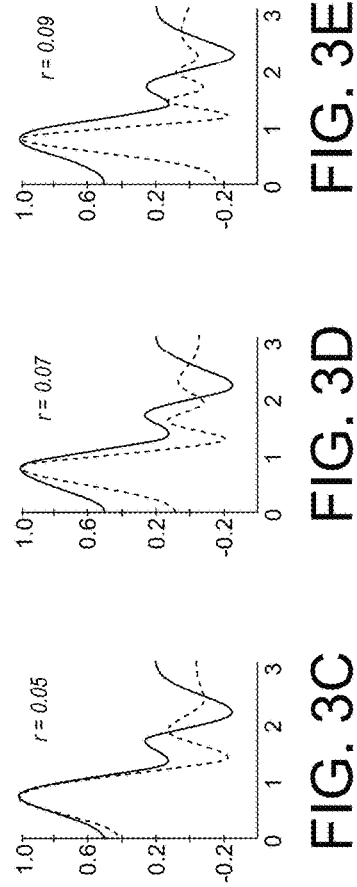
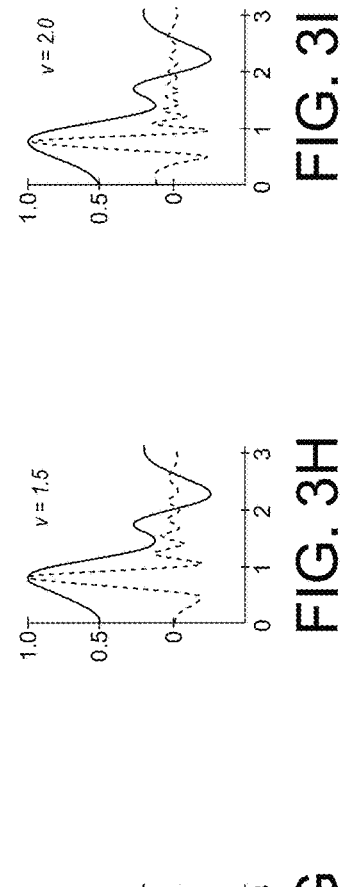
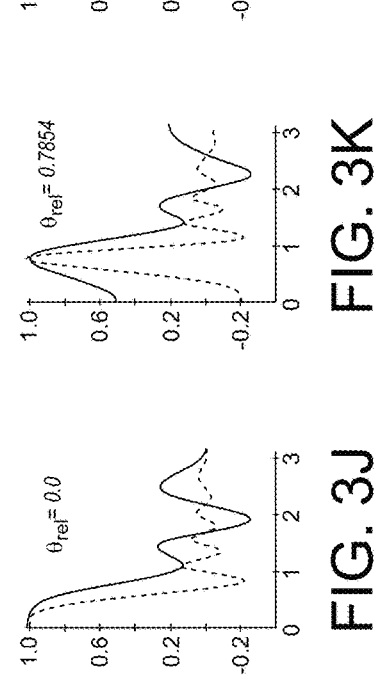
FIG. 3A FIG. 3B FIG. 3C FIG. 3D FIG. 3E
FIG. 3F FIG. 3G FIG. 3H FIG. 3I
FIG. 3J FIG. 3K FIG. 3L FIG. 3M FIG. 3N

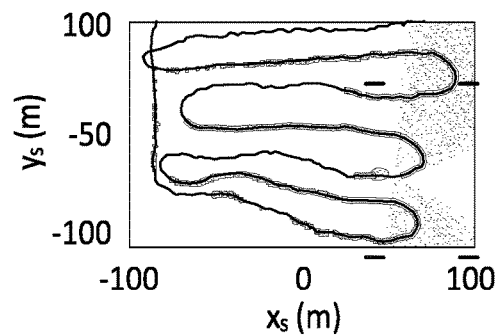
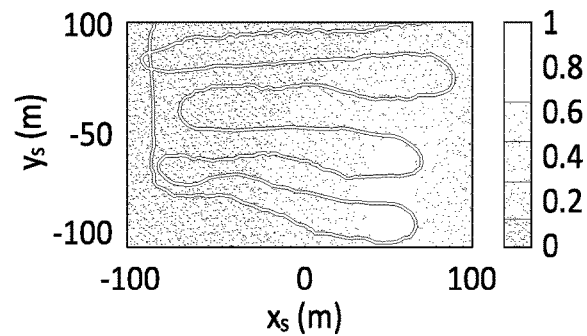
FIG. 9A
FIG. 9B
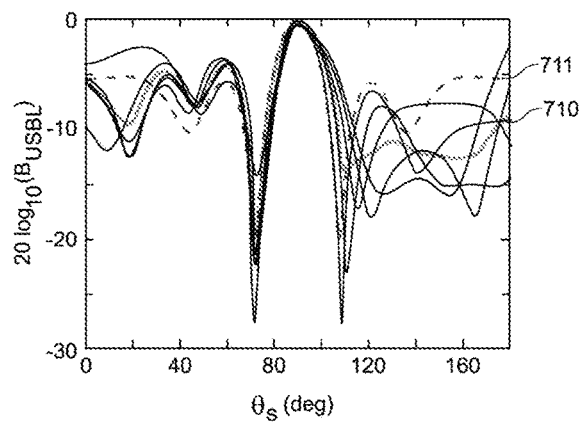
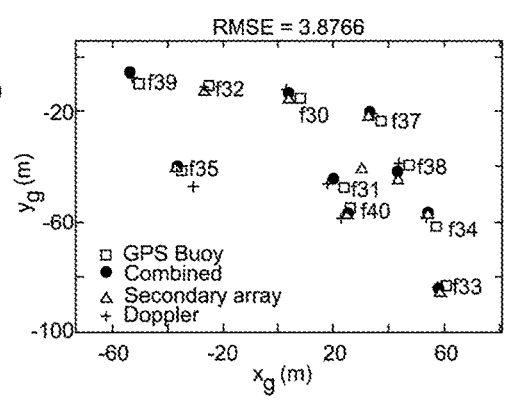
FIG. 10A
FIG. 10B

SINGLE-RECEIVER DOPPLER-BASED SOUND SOURCE LOCALIZATION TO TRACK UNDERWATER TARGET

CROSS-REFERENCE(S) TO RELATED APPLICATION(S)

This application claims benefit to U.S. Provisional Patent Application No. 63/078,978, filed Sep. 16, 2020, the disclosure of which is hereby incorporated by reference in its entirety.

FIELD OF THE DISCLOSURE

This disclosure relates to submerged tracking and navigation without the continuous aid of a global coordinating system. More particularly, this invention relates to underwater relative tracking and navigation of at least one submerged object being tracked or navigating within a relative reference frame of a source.

BACKGROUND

Underwater communications, navigation, and tracking solutions primarily use either optical (i.e., light) or acoustic (i.e., sound) electromagnetic energy. Optical solutions are often used for in-air communications solutions, but this solution does not currently extend as well to the underwater domain, for a reason of basic physics; the attenuation of light in water is 10 orders of magnitude greater than that in air. Point-to-point optical communications is still possible, but underwater navigation is rendered ineffective at appreciable distances.

Current autonomous underwater vehicle (AUV) navigation or tracking is either expensive or unwieldy, requiring high-power sensors such as inertial navigation sensors (INS) that cost hundreds of thousands of dollars, frequent surfacing for GPS, or the deployment of geo-located acoustic beacons, limiting the navigable operational area, which is a severe constraint given the scale of oceanographic sensing. Precisely moving or tracking underwater vehicles would require a navigation and communication scheme requires expensive, large, and power-hungry components.

One attempt at single beacon, relative navigation is described in U.S. Patent Application Publication 2019/0204430 A1 by Schmidt et al. However, this solution requires an expensive, extremely precise clock that results in parts costs of several thousand dollars per vehicle. Another approach is described in WO2021/067919 A1 by Fischell et al., incorporated herein in its entirety.

A desirable solution, that is described herein, would make underwater navigation and tracking possible by using a single source (most often acoustic) and Doppler-based frequency change and beamforming processing to precisely determine a relative angle to the source, thereby tracking the sound source. In this solution, a source is attached to an object to be tracked (a tracked package) that emits a signal with known frequency. A tracking vehicle such as an AUV or an ASV (autonomous surface vehicle) can then receive the signals as they travel through the underwater environment, determining Doppler shift, and beamforming over samples taken at different times or positions.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An object of the present disclosure is to provide a simpler and less expensive tracking and navigation solution for underwater use.

This invention features a non-transient computer readable medium containing program instructions for causing a computer to perform a method including receiving, from a receiver, over time a plurality of samples n, each sample of the plurality of samples having a received frequency $f_r$ and originating from a selected source emitting signals into the environment. The signals have a source frequency $f_s$. The method further includes generating a first velocity magnitude $|v_r|$ and forming a virtual array with a first sample and a second sample of the plurality of samples n. The first sample has a first received frequency and the second sample has a second received frequency. A relative angle to the source from the receiver is then determined using the source frequency $f_s$. The virtual array includes the first received frequency and the second received frequency $f_r$, and the first velocity magnitude $|v_r|$ to provide an estimate of location of the selected source.

In some embodiments, a plurality of samples n are received from only a single receiver. In certain embodiments, the velocity magnitude $|v_r|$ is determined by a position module. In one embodiment, the velocity magnitude $|v_r|$ is determined by an underwater positioner. Between sample acquisition by the receiver, the tracker may perform different behaviors (for example, see discussion below of FIGS. 2A-2G and 11) as instructed by the controller. In other words, the controller may instruct a motor to operate a propeller or other thruster to alter the velocity and/or heading of the tracker.

In another embodiment, the plurality of samples n are assumed to have a constant waveform ping with the source frequency $f_s$, and a constant pulse duration 1, and the determining said relative angle further uses the constant waveform ping and the constant pulse duration. In one embodiment, the receiver receives the plurality of samples n at a sampling rate of $F_s$, and the first velocity magnitude $|v_r|$ is not zero. In another embodiment, the method further includes the step of generating a second velocity magnitude $|v_r|$. In one embodiment, the two steps of $1^{st}$ and $2^{nd}$ sample n are gotten at the same time as $1^{st}$ and $2^{nd}$ $|v_r|$. In some embodiments, the sample number n is generated by multiplying the pulse time duration t by the sample rate $F_s$. In certain embodiments, the method further includes:

(a) calculating a time phase shift from the time difference between the sampling time of said first and said second sample of said plurality of samples n;
(b) calculating a distance phase shift from the position difference between said first velocity magnitude $|v_r|$ and said second velocity magnitude $|v_r|$; and
(c) wherein said determining said relative angle further includes beamforming said time phase shift and said distance phase shift.

In one embodiment, the beamforming produces a maximum beampattern $\theta_s$ that corresponds to the direction of incidence $\theta_{rel}$.

This invention may also be expressed as a system of Doppler-based relative angle resolution to track a selected package, including a tracked package with a signal source, also referred to herein as a source, that is configured to produce signals capable of traveling through the environment and having a source frequency $f_s$. The system further includes a tracker having a receiver, a position module, and a controller connected to the receiver and the position module. The receiver is configured to receive the signals thereby producing a plurality of samples n, each sample of the plurality of samples having a received frequency $f_r$. The tracker has a first velocity magnitude $|v_r|$ that generated by one of the position module and the controller. The controller is configured form a virtual array with a first sample and a second sample of said plurality of samples n, the first sample having a first received frequency and the second sample having a second received frequency. The controller is further configured to determine a relative angle to the source from the receiver using the virtual array including said first and said second received frequency $f_r$, said source frequency $f_s$, and said first velocity magnitude $|v_r|$ to provide an estimate of location of the tracked package.

In a number of embodiments, the tracker contains only a single receiver. In certain embodiments, the source produces signals having a constant waveform ping with the known signal source frequency $f_s$, and a constant pulse duration $\tau$. In some embodiments, the first velocity magnitude $|v_r|$ is not zero. The controller is further configured to receive a second velocity magnitude $|v_r|$, to calculate a time phase shift from the time difference between the sampling time of the first sample and the second sample of the plurality of samples, and to calculate a distance phase shift from the position difference between the first velocity magnitude and the second velocity magnitude; and wherein the controller's configuration to determine the relative angle further comprises beamforming the time phase shift and the distance phase shift. In one embodiment, the beamforming produces a maximum beampattern $\theta_s$ that corresponds to the direction of incidence $\theta_{rel}$.

This invention further features a method of Doppler-based relative angle resolution including selecting a tracked package having a source configured to produce signals having a source frequency $f_s$ capable of traveling through an environment, and selecting a tracker having a receiver and a controller connected to the receiver. The receiver is configured to receive signals traveling through the environment. The tracker has a first velocity magnitude $|v_r|$ that is generated by one of the position module and the controller. The method further includes receiving, with the receiver, the signals, thereby producing a first sample having a first received frequency $f_r$ and a second sample having a second received frequency $f_r$, and forming a virtual array with the first and the second sample. A relative angle to the source from receiver is determined using the signal source frequency $f_s$, the virtual array including the first received frequency and the second received frequency, and the first velocity magnitude $|v_r|$ to provide an estimate of location of the selected source.

In some embodiments, the first velocity magnitude is not zero and the method further includes the step of receiving a second velocity magnitude $|v_r|$. In one embodiment, the position module generates and sends the first velocity magnitude $|v_r|$ and the second velocity magnitude $|v_r|$ to the controller.

In certain embodiments, the method further includes: (i) calculating, with the controller, a time phase shift from the time difference between the sampling time of the first sample and the second sample of the plurality of samples n; (ii) calculating, with the controller, a distance phase shift from the position difference between the first velocity magnitude $|v_r|$ and the second velocity magnitude $|v_r,j|$; and (iii) the determining the relative angle further includes beamforming the time phase shift and the distance phase shift. In some embodiments, the method further includes instructing a motor of a propulsion mechanism such as a propeller or other thruster to alter the velocity and/or heading of the tracker.

BRIEF DESCRIPTION OF THE DRAWINGS

In what follows, preferred embodiments of the disclosure are explained in more detail with reference to the drawings, in which:

FIGS. 2C-2D, a tracker stopping ($|\vec{v}_r|=0$) to estimate the frequency associated with the velocity of the source relative to the receiver ($f_a$ for aggregate frequency); FIG. 2E represents a tracker finding a heading to source; FIGS. 2F-2G, a tracker having a constant velocity to determine the relative angle to source $\theta_{rel}$;

FIGS. 3A-3N are comparisons of beampatterns for Doppler and USBL over a range of conditions, with Beampattern B on the y-axis and look-angle in radians on the x-axis, dotted lines illustrate the Doppler results and solid lines illustrate the Doppler-compensated USBL result which neglects motion; FIGS. 3A-3E illustrate relative angles; FIGS. 3F-3I illustrate ping length; and FIGS. 3J-3N illustrate relative velocity;

FIG. 4A illustrates velocity vectors towards a source, with X position (meters) on the x- and y-axis; FIGS. 4B-4N show beampattern on the y-axis; FIG. 4M shows X position (meters) on the x- and HPBW in degrees on the y-axis;

FIG. 6A shows the entire survey, and FIG. 6B shows the survey from 650 to 850 seconds as the ASV tracker 121 passes the tracked package 101 emitting signals 103 at 34 kHz;

FIG. 8A shows the entire survey; and FIG. 8B shows the survey from 650 to 850 seconds as the ASV passes the target emitting at 34 kHz;

FIG. 9A illustrates one example of gridded Doppler beam pattern for an individual ping near one of the tracked packages in the exemplified embodiment; FIG. 9B shows the sum of all gridded Doppler beam patterns with a star symbol at the tracked package's estimated location as estimated by the peak of the sum;

FIG. 10A illustrates one example of USBL Beam Pattern for 5 pings near the target (t=771 to 775 s, thin black lines) and average of the 5 pings (thick line 710). Predicted Beam Pattern from theory is shown as a black dotted line 711. All Beam Patterns are shifted to have peaks at $\theta_s$=90;

FIG. 10B shows the results from the exemplified embodiment, the results of gridded tracking from GPS Buoys (squares), Combined Doppler and secondary array 129 Beamforming (black circles), secondary array 129 Beamforming Only (triangles), and Doppler Only (plus symbol). The targets are labelled by pinger frequency in kHz.

DEFINITIONS

Figure 1A:
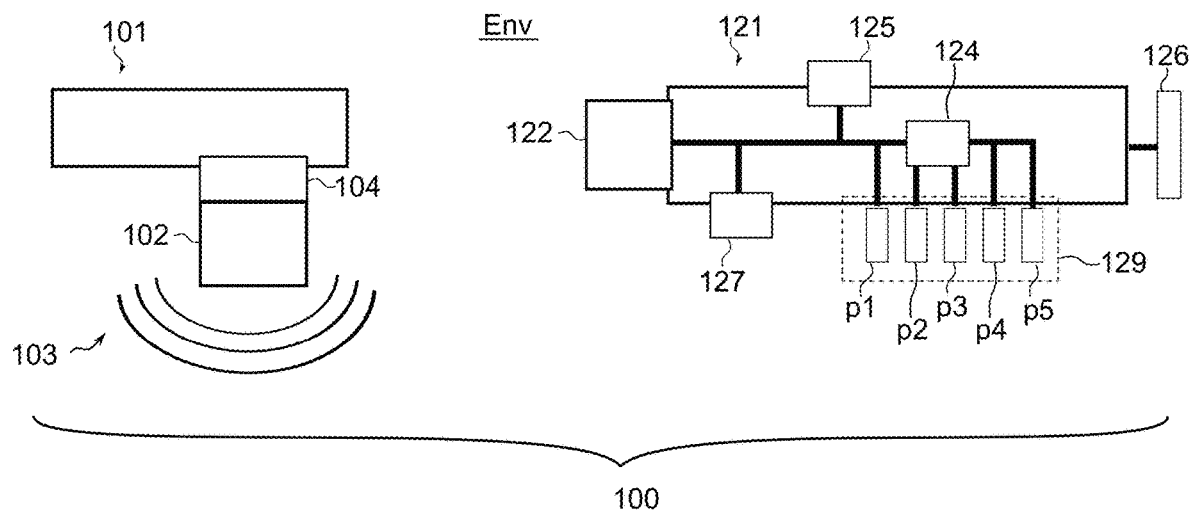
FIG. 1A schematically illustrates one tracked package 101 and a tracker 121 according to one embodiment of the present disclosure.
Figure 1B:
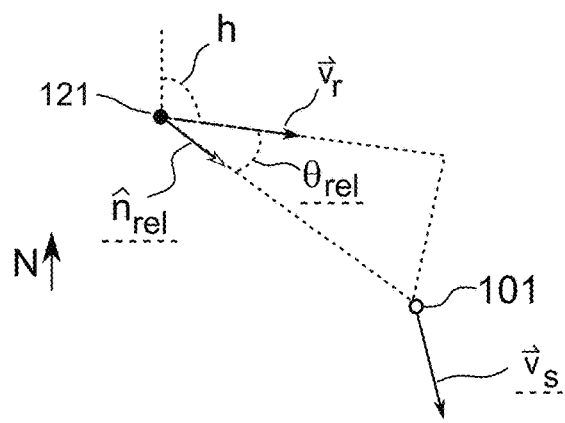
FIG. 1B illustrates the definition of problem space for bearing estimation from Doppler shift.

The term "relative angle" as utilized herein refers to the angle $\theta_{rel}$ that points to a selected signal source such as a source 102 (or a tracked package 101) from a receiver 122 (or a tracker 121), relative to the direction of movement or heading of tracker 121, such as illustrated in FIGS. 1A-1B, for example.

The term "velocity magnitude" as utilized herein refers to the absolute value of velocity vector $|\vec{v}_r|$ of tracker 121.

The term "connected" as utilized herein includes wireless communications between components.

DETAILED DESCRIPTION

Overview

The present disclosure describes a system 100 for tracking a selected source 102 with a receiver 122, as illustrated in FIG. 1A. Typically, the system 100 performs acoustic tracking underwater in environment Env. The source 102, also referred to herein as a signal source, is often incorporated into, attached to, or connected to a selected tracked package 101. Most often, the tracked package 101 comprises the source 102 and an attachment mechanism 104. Source 102 produces signals 103 that travel through the environment Env. The receiver 122 is often incorporated into a tracking package 121, also referred herein as the tracker 121. In many embodiments, the tracker 121 comprises a receiver 122, a position module such as a position mechanism 125, and a controller 124. The position module is also referred to herein as position module 125, although that is not a limitation of the present invention because the position module may include another component such as an underwater positioner 127, either together with or in substitution for the position mechanism 125. The receiver 122 detects the signals in the environment Env, producing a series of samples n over time (and in some cases, distances). Samples n are machine readable, electronic signals.

The controller 124 is configured to process the samples and determine a relative angle $\theta_{rel}$ that points to the source 102 from receiver 122, relative to the direction of movement of the tracker 121, to provide an estimate of location of the selected source 102. In many embodiments, the tracker 122 also has a propulsion mechanism 126, referred herein as the propulsor 126, that is capable of moving the tracker 121 through the environment Env. In these embodiments, the tracker 121 is further configured to determine its own position in the environment Env. In some cases, the position mechanism 125 provides this capability, in other cases an additional underwater positioner 127 provides this capability. In either case, in these embodiments, the position mechanism 125 or the underwater positioner 127 represents a position module that is connected to, and provides velocity data to the controller 124. The velocity data contains information relating to the absolute velocity magnitude $|v_r|$ of the receiver 122 (and most often the tracker 121). In these embodiments, the controller also uses the velocity data and/or the velocity magnitude $|v_r|$ to determine the relative angle $\theta_{rel}$ to the source. In some embodiments, position mechanism 125 and/or positioner 127 generates the velocity magnitude $|v_r|$ and, in other embodiments, the velocity magnitude $|v_r|$ is generated by the controller 124 based on velocity data provided to the controller 124 by the position module.

Source of Signals

The present disclosure includes a source 102 configured to emit or otherwise send signals 103 into the environment Env. In most embodiments, the signal source is integrated into a tracked package 101. Integration may include, in some embodiments, attachment to a tracked package 101, incorporation into the tracked package 101, attachment to the tracked package 101 via an attachment mechanism 104 (as illustrated in FIG. 1A), loose attachment (e.g., by a line, see Example Section below), and other attachment schemes as known in the art.

The source preferably emits signals 103 at a known frequency, referred herein as source frequency $f_s$, and a known pulse duration T. The source 102 may be any suitable solution as known in the art. In some currently preferred embodiments, the source 102 is a commercially acoustic pinger or transponder, as commonly known. In other embodiments, the source 102 is a commercially available echosounder. In some embodiments, the source 102 is a natural phenomenon that produces signals 103. In some embodiments, the source 102 is a passive source, for example, ship vibration noises, propeller noises, and the like.

Receiver 122

The present disclosure provides a solution to receive signals 103 in the environment Env, referred herein as receiver 122, which is most often incorporated into a tracker 121. The receiver 122 is preferably connected to the controller 124 and sends samples n to the controller 124. Receiver 122 integration into a tracker 121 may include, physical attachment, loose attachment, partial or full incorporation into a hull or other pressure case, or other attachment schemes as known in the art. In most preferred embodiments, receiver 122 is built (i.e., incorporated) into the tracker's hull. The receiver 122 detects signals 103 in the environment Env and in turn, turns them into machine-readable information, referred herein samples n. Samples n may be analog or digital signals 103. The receiver 122 may be any suitable solution as known in the art. In some preferred embodiments, the receiver 122 is an echosounder or a transponder. The receiver 122 must be capable of detecting signals 103 in the environment Env; and the receiver 122 may further be capable of emitting signals itself. A tracker 121 with a receiver 122 capable of emitting additional signals may be considered itself to be a tracked package 101 by additional trackers. Typically source 102, signals 103, and receiver 122 operate in the acoustic electromagnetic energy range.

The tracked package 101 of the present disclosure may be any suitable object as known in the art. One specific tracked package 101 is given in the example below herein. Typically, the tracked package 101 will have at least a source 102; additional components may be on the tracked package 101, including an attachment mechanism 104, a propulsion solution, a digital control solution, and the like, all as known commonly in the art.

The tracker 121 most often includes the receiver 122, a position module including a position mechanism 125, and a controller 124. Optional components include a propulsor 126, a communication means 130, a secondary array 129, and other known components. The propulsor 126 may be any solution known in the art that provides a motive force to the tracker 121 (e.g., move through the water with a propeller). The position mechanism 125 may be any suitable solution or solutions as known in the art. Some embodiments may use the position mechanism 125 for both in-air and in-water positioning. Some embodiments may use the position mechanism 125 for in-air positioning (e.g., a GPS unit), as well as have an underwater positioner 127 for in-water positioning. Both the position mechanism 125 and the underwater positioner 127 typically provide position information over time, thus providing velocity data to the tracker 121. The term velocity data includes information utilized to determine the velocity of the receiver 122 (referred elsewhere herein as receiver velocity), which typically corresponds to the overall tracker 121 velocity. In some embodiments, the position mechanism 125 is accompanied by a base station for more accurate positioning. In one construction, a base station is a GPS receiver that collects GPS measurements at a known location; its main components are an antenna, a GPS receiver, and a device to which the GPS data is logged—most often a personal computer. The antenna's location is determined very accurately (to within a few centimeters or less) by surveying methods. A base station provides reference data that can be used to increase the accuracy of a position mechanism 125 or an underwater positioner 127.

Secondary Array 129

The present disclosure provides for a second positioning solution for the tracker 121, referred herein as the secondary array 129. The secondary array 129 may be any suitable solution or solutions as known in the art. One embodiment of a secondary array 129 is illustrated in FIG. 1A where the entire secondary array 129 is depicted as dotted box 129 and individual elements (e.g., hydrophones) in the array are labeled as p1-p5. In most preferred embodiments, the secondary array 129 is an ultra-short baseline (USBL) acoustic positioning system, as known in the art. In other embodiments, the secondary array 129 is short baseline (SBL) acoustic positioning system. In less preferred embodiments, the secondary array 129 is a long baseline (LBL) acoustic positioning system 100. The secondary array 129 is connected to the controller 124 and is configured to send machine-readable information (similar to receiver 122 generating samples n) to the controller 124. The controller 124 may then use the secondary array's information to determine a relative angle to the tracked package 101. In many embodiments, the secondary array 129 information may be used in conjunction with the information gained from the receiver 122 (e.g., Doppler shift effect information) as described elsewhere herein.

Controller 124

The Controller 124 is provided in the tracker 121 to control various aspects of the disclosed system 100, method, and components of tracker 121. The controller 124 may be any suitable solution or solutions as known in the art. The controller 124 is configured to accept information from the interconnected components, including the receiver 122, the position mechanism 125, and the underwater positioner 127, if present. The controller 124 is configured to determine at least an angle relative $\theta_{rel}$ from the receiver 122 (and therefore the overall tracker 121) to the source 102 of signals 103. In many embodiments, the controller 124 may send commands to other components, for example, to change the speed of propulsor 126, or direction of tracker 121 movement by adjusting fins, rudders or other control surfaces, as commonly known. The controller 124 may send and receive information or commands via the communication means 130, if present, often receiving updated commands from a remote user or reporting tracking information (i.e., tracker 121 position information and relative angle information) to a remote user.

The controller 124 is a digital controlling system, configured to send commands and to receive information from suitable components of the system 100, as well as components outside the system. The controller enables real-time operational control of the system by receiving data from components (e.g. sensors), storing that data, and changing parameters of the interconnected components. In the currently preferred embodiment, the controller consists of a central processing unit (cpu), random access memory (RAM), long-term memory storage, and optionally, analogue to digital converters. In one embodiment the controller comprises a Raspberry Pi computer coupled to an additional analogue-to-digital converter board and long-term memory. In many embodiments, the controller consists of one or more circuit boards, which may include a microcontroller circuit board (commonly referred to as a microcontroller), one or more power management boards, and one or more distribution boards. In some embodiments, all of the circuit boards may be centralized onto one circuit board, referred to as an integrated circuit.

Mathematical Basis

The present disclosure provides a system, method, and non-transient computer readable medium containing program instructions to perform a method using the Doppler principle with known-frequency sound sources underwater and a mobile, one or more single-receiver objects that uses the Doppler effect to estimate receiver-to-source bearing directly from sensed frequency. System 100 uses the well-established Doppler effect that states, when there is a relative velocity between source 102 and receiver 122, the perceived frequency at the receiver 122, denoted $f_r$ is shifted, as illustrated in Math 1.

$$f_r = \frac{f_s(c + \vec{v}_r \cdot \hat{n}_{rel})}{c - \vec{v}_s \cdot \hat{n}_{rel}}. \qquad \text{Math 1}$$

In Math 1, $f_r$ is the received frequency, $f_s$ is the source frequency, $\vec{v}_r$ is the velocity of the receiver (derived from velocity data), s is the velocity of the source, and $\hat{n}_{rel}$ is the unit vector connecting source 102 and receiver 122 positions, as shown in FIG. 18. In certain embodiments, the source 102 is assumed to be fixed or moving with a known velocity at an unknown location; the receiver 122 is assumed to be moving with a known position and velocity. The receiver velocity $\vec{v}_r$ and position can be determined on an autonomous surface vehicle (i.e., tracker 121) via its position mechanism 125, e.g., a global position system (GPS): the accuracy of each is dependent on position mechanism 125 hardware, configuration, and if a base station is used for more accurate positioning. We can define $\hat{n}_{rel}$ in terms of an angle between the receiver velocity vector and the normal vector connecting the source and receiver as: $\vec{v}_r \cdot \hat{n}_{rel} = |\vec{v}_r| \cos(\theta_{rel})$. The accuracy of the technique for quantitative estimation of bearing will be dependent on accuracy of receiver velocity $\vec{v}_r$; larger errors will result in degraded estimates. The specific impact of heading and speed error are discussed in detail in elsewhere herein, specifically in the Basis III-B Section below.

Basis III-A) One or Both of Bearing and Heading from Doppler

In certain cases, using the above formulation, the heading to a sound source 102 is desired. This can be determined based on Doppler estimation, spanning the space of whether $\vec{v}_s$ is 0, known, or unknown and whether $f_s$ is known or unknown, assuming $\vec{v}_r$ is known (known in all of the preceding possible conditions).

In a first case, source velocity $\vec{v}_s$ is zero; the bearing from the receiver to the source ($\theta_{rel}$) can be estimated directly based on the received frequency $f_r$ for a case where the source velocity $|\vec{v}_s|=0$ and the source frequency $f_s$ is known and is mathematically shown in Math 2.

$$\cos(\theta_{rel}) = \frac{c(f_r - f_s)}{|v_r|f_s}. \qquad \text{Math 2}$$

If $f_s$ is unknown but the source 102 is known to be stationary, source frequency must first be estimated. This is done by setting receiver velocity to 0, i.e. $\vec{v}r=0$, in which case $f_r=f_s$. Once $f_s$ is known, Math 2 may be used. In addition, zero source velocity makes it possible to simplify the relationship between source and receiver frequencies further by describing the received frequency as the source frequency plus a Doppler shift $f_d$ as expressed in Math 3 and Math 4.

$$f_r = \frac{f_s(c + \vec{v}_r \cdot \hat{n}_{rel})}{c}, \qquad \text{Math 3}$$

$$f_r = f_s + f_r|\vec{v}_r|\cos(\theta_{rel})/c = f_s + f_d. \qquad \text{Math 4}$$

In a second case, the source velocity is non-zero; if the source velocity is non-zero, and frequency is known (and assuming $\vec{v}_r$ is known), receiver adaptation is used to first estimate the magnitude of the source velocity along the relative normal vector (i.e., $\vec{v}_s \cdot \hat{n}_{rel}$). To do this, the receiver 122 stops, so that the frequency shift may be measured as expressed in Math 5 and Math 6. And then the receiver 122 may then begin moving (typically, by moving the entire tracker 121) with constant velocity $\vec{v}_r$ so that bearing may be directly estimated with Math 7. This process would typically be repeated as $\vec{v}_s \cdot \hat{n}_{rel}$ changes because the source is approaching/departing from the receiver, or as $\vec{v}_s$ changes.

$$f_r(\vec{v}_r = 0) = f_s \frac{c}{c - \vec{v}_s \cdot \hat{n}_{rel}} \qquad \text{Math 5}$$

$$\vec{v}_s \cdot \hat{n}_{rel} = c - \frac{f_s}{f_r(\vec{v}_r = 0)} \qquad \text{Math 6}$$

$$\cos(\theta_{rel}) = \frac{f_r/f_s(c - \vec{v}_s \cdot \hat{n}_{rel}) - c}{|\vec{v}_r|} \qquad \text{Math 7}$$

Figure 2A:
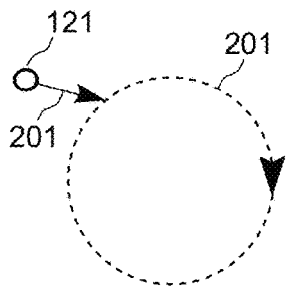
FIGS. 2A-2G illustrate receiver and tracker adaptations (i.e., behaviors) for estimation of heading or bearing to source based on Doppler effects: The following illustrations are tracker behaviors, FIGS. 2A-2B, a tracker circling at constant speed.
Figure 2B:
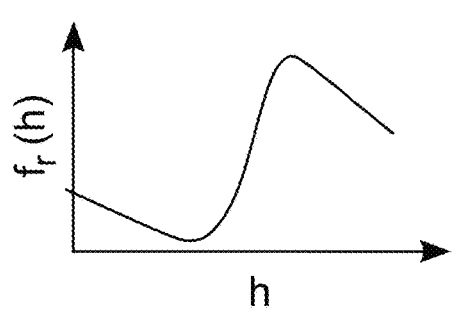
Figure 2C:
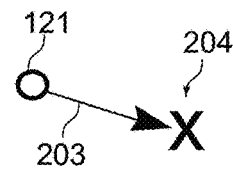
Figure 2D:
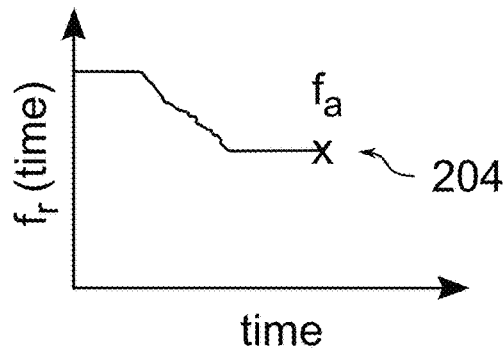
Figure 2E:
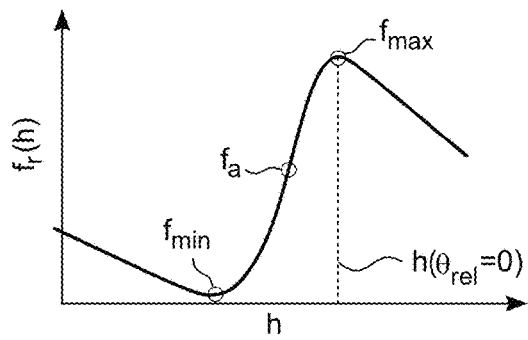
Figure 2F:
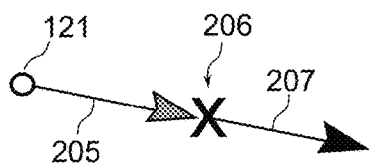
Figure 2G:
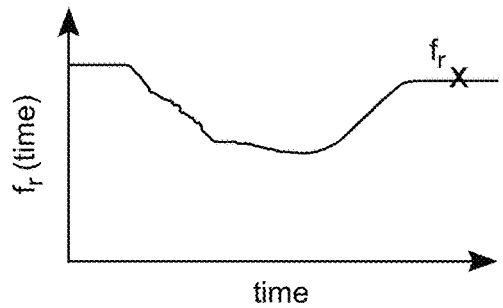
Figure 4A:
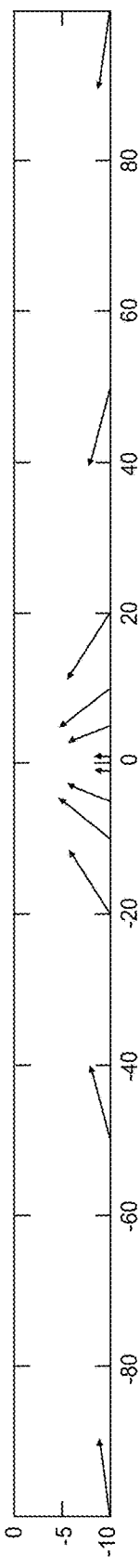
FIGS. 4A-4M illustrate the impact of approach on a source by a constant-velocity receiver due to the changing virtual array size of $\tau|\vec{v}_r| \cos \theta_{rel}$.
Figure 4B:
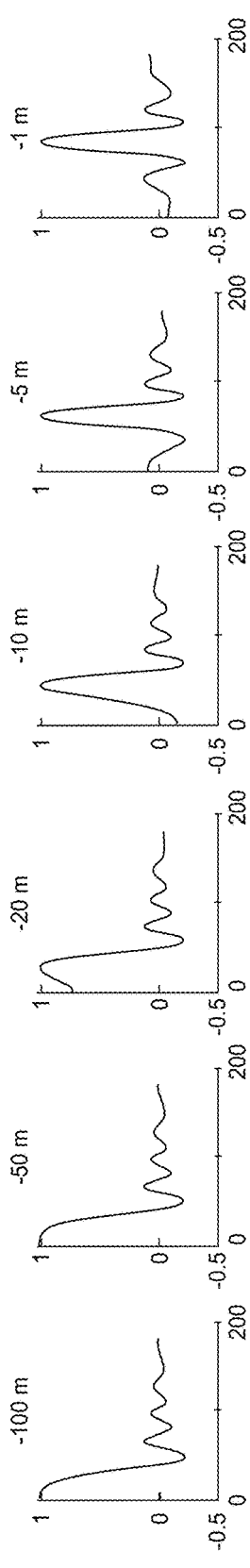
Figure 4C:
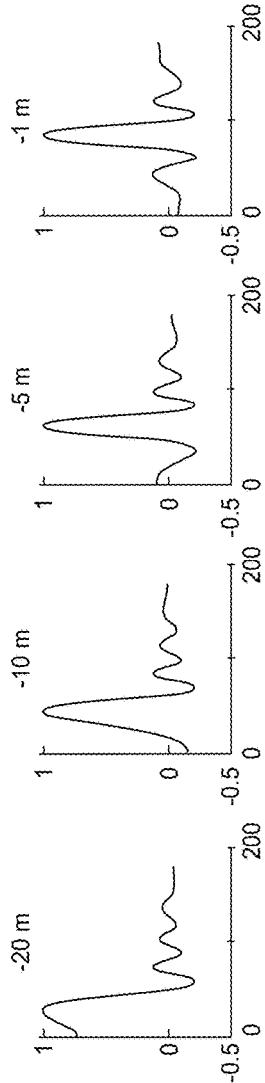
Figure 4D:
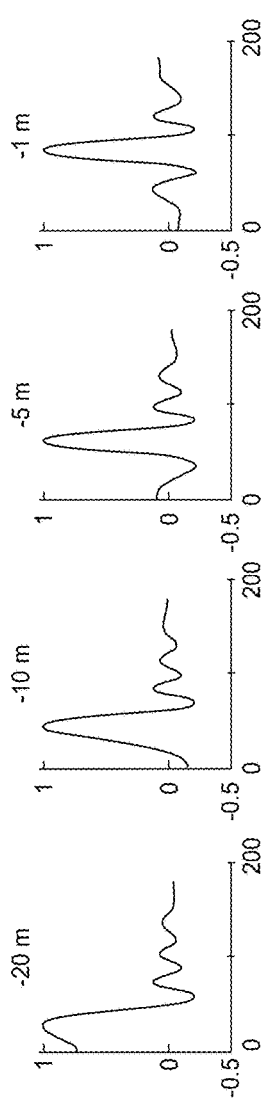
Figure 4E:
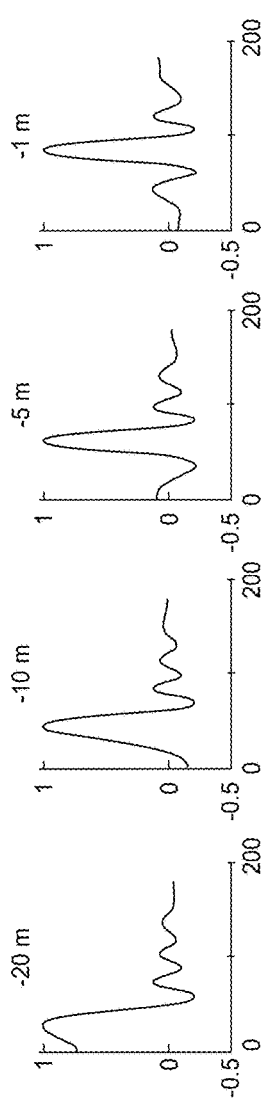
Figure 4F:
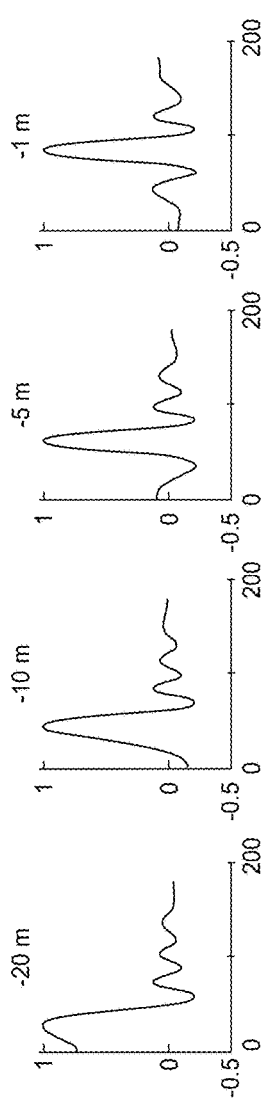
Figure 4G:
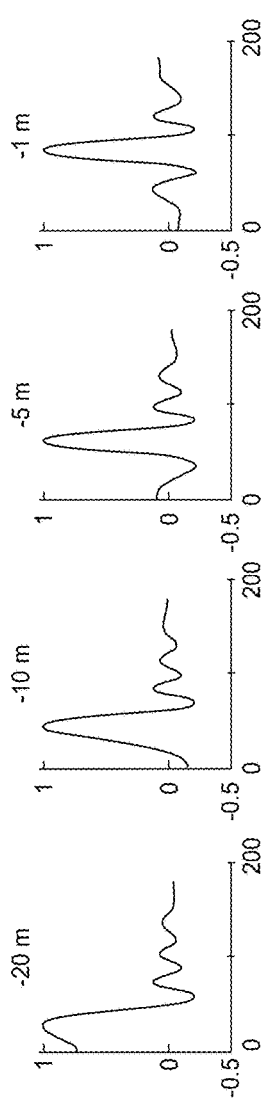
Figure 4H:
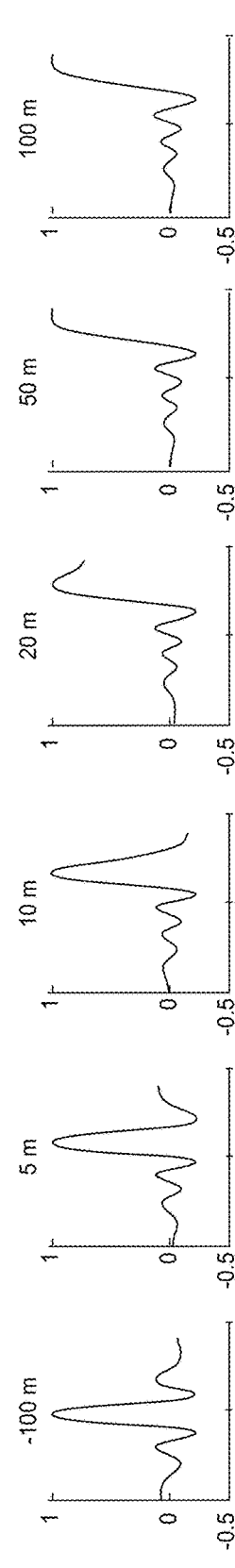
Figure 4I:
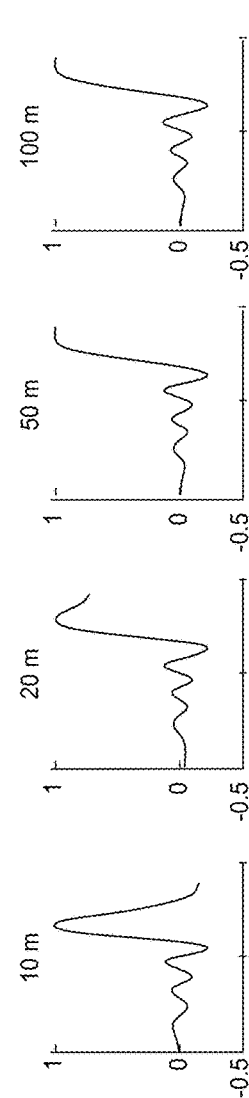
Figure 4J:
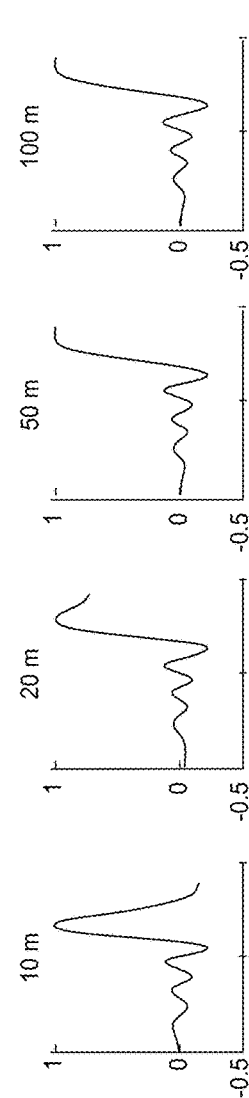
Figure 4K:
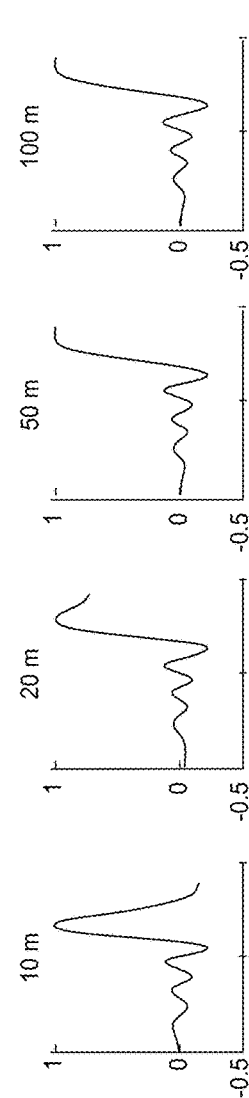
Figure 4L:
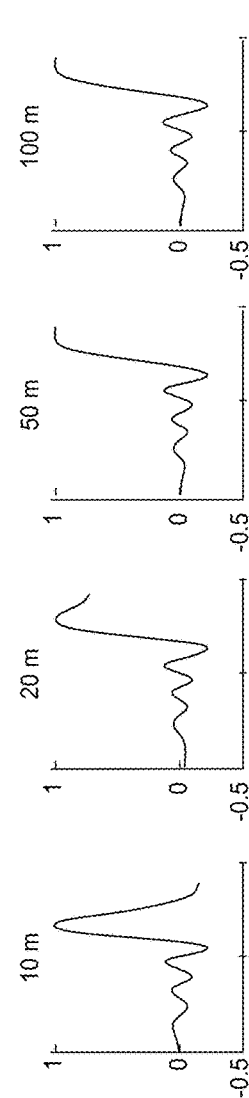
Figure 4M:
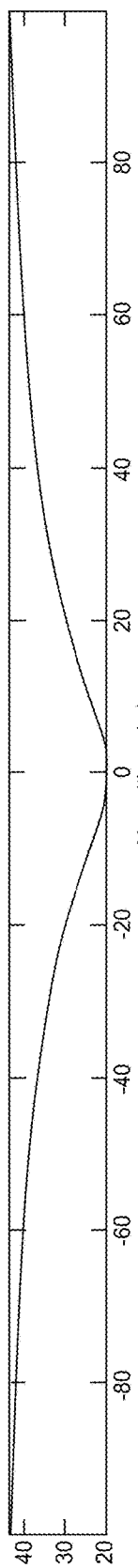

In a third case, if $f_s$ is unknown, the frequency associated with the velocity of the source relative to the receiver ($f_a$ for aggregate frequency) can be used instead from a "stop" adaptation, in which case, Math 8 applies. This behavior is illustrated in FIGS. 2C and 2D, where tracker 121 is moving in line 203 and stops, illustrated as 'X' 204 in FIGS. 2C and 2D where $|\vec{v}_r|=0$. And constant-velocity receiver motion is then used to estimate $\theta_{rel}$ in Math 9. A stop-and-then-resume behavior is illustrated in FIGS. 2F and 2G, where tracker 121 moves along path 205, stops at point 206, then resumes moving along path 207; FIG. 2G illustrates the received frequency $f_r$ as a function of time for this behavior. An alternative adaptation to the stop-and-then-resume constant velocity behavior is to circle, estimating received frequency $f_r$ versus heading h. This behavior is illustrated in FIGS. 2A and 2B, where tracker 121 changes movement behavior from straight line 201, to circle behavior (dashed line 201), during which time it estimates received frequency $f_r$ versus heading h as graphed in FIG. 2B. The maximum frequency $f_{max}$ during a 360-degree revolution at constant speed corresponds to the heading to the sound source; $f_a$ corresponds to the mean of the minimum and maximum received frequencies as illustrated in Math 10.

$$f_a = f_s \frac{c}{c - \vec{v}_s \cdot \hat{n}_{rel}} \qquad \text{Math 8}$$

$$\cos(\theta_{rel}) = \frac{f_s/f_a - c}{|\vec{v}_r|}. \qquad \text{Math 9}$$

$$f_r = \frac{f_s(c + \vec{v}_r \cdot \hat{n}_{rel})}{(c - \vec{v}_s \cdot \hat{n}_{rel})}. \qquad \text{Math 10}$$

Basis III-B) Beampattern Equivalent

A synthetic aperture array analogy aids in understanding why this technique is effective, and provides numerous possible expansions on this method using adaptive and/or optimal techniques. Assuming the receiver 122 has a known velocity in space, the velocity results in intersection of the receiver with different phases of the wave. If the receiver were stationary, there would be no spatially-driven phase shift with which to provide a "beamforming" estimate; but with a mobile receiver, the waves intersect with the receiver in space, causing spatial and temporal phase move-out that can be used for bearing estimation. Spatial phase move-out is referred herein as a distance phase shift and temporal phase move-out is referred herein as a time phase shift. While the results of this are match well to the frequency-based estimation (i.e., Fourier transform of frequency to get wavenumber), re-formulating the problem based on beamforming analysis provides a straightforward means to compare Doppler-based angle estimation with USBL results. This formulation has the addition benefit of being compatible with established optimal and adaptive array processing techniques.

For a hydrophone at a location $\vec{p}$, for an incident plane wave signal with known frequency ω (lower case omega) and wavenumber vector $\vec{k}$, the signal can be described as illustrated in Math 11. In a conventional array, samples are taken with identical time steps across the array. For a line array oriented along an axis described as p, the signal sensed along the array at element i, X[i] may be represented in terms of the p position of the element p[i], angle of incidence of the incoming plane wave $\theta_{rel}$, and the magnitude of the wavenumber vector |k|=ω/c, as mathematically illustrated in Math 12, where i is between 0 and M−1 and is the index number of the array element.

To beamform this signal, you "steer" or "look" in each possible direction s, introducing the phase shift that would occur at each array element if the signal were coming in that direction. By summing the resulting phase-shifted energy across the array, the direction of the incoming energy can be established as the maximum in the beampattern $B(\theta_s)$ as expressed in Math 13. Additional information on beamforming techniques are detailed in "Timed Arrays: Wideband and Time Varying Antenna Arrays" by Randy L. Haupt, IEEE, 2015, doi: 10.1002/9781119071822, incorporated by referenced in its entirety herein.

$$X = Ae^{j(\omega t - \vec{k} \cdot \vec{p})}. \qquad \text{Math 11}$$

$$X[i] = Ae^{j(|k|p[i]\cos\theta_{rel})}, \qquad \text{Math 12}$$

$$B(\theta_s) = 1/M \sum_{i=0}^{M-1} X[i]e^{-j(|k|p[i]\cos\theta_s)}. \qquad \text{Math 13}$$

For the theoretical case where $X[i]=Ae^{j(|k|p[i]\cos\theta_s)}$, this function will have its maximum where $\theta_s=\theta_{rel}$.

A similar beamforming method may be used on data from a mobile single sensor where the velocity is known: in that case, the receiver 122 intersects the plane-wave incoming signal at multiple points in space and time. For single-sensor synthetic aperture beamforming, we assume that the receiver 122 has a velocity magnitude $|\vec{v}_r|$, a sample rate $F_s$, and an angle relative to the source $\theta_{rel}$. For this analysis, the signal is assumed to be a gated constant waveform ping with frequency $f_s$, with pulse duration τ. As the receiver moves through space during receipt of the ping, a virtual array is formed with received signal at each sample n, according to Math 14.

In other words, there is a phase shift introduced by the time that has passed since the last measurement $e^{j\omega n/F_s}$ (a time phase shift 131) and a phase shift due to the position change since the last measurement $e^{jn|k||\vec{v}_r|\cos\theta_s/F_s}$ (a position phase shift 132) The number of samples N is the time duration of the ping multiplied by the sample rate as defined in Math 15. This can be beamformed by introducing a phase shift due to the time factor (i.e., the time phase shift 131) alone or also with the spatial difference (i.e., the position phase shift 132) to back out the bearing to the sound as illustrated in Math 16. The maximum of the beampattern in $\theta_s$ corresponds to the direction of incidence $\theta_{rel}$.

$$X[n] = Ae^{j\left(\frac{\omega n}{F_s} + \frac{n|k||\vec{v}_r|\cos\theta_{rel}}{F_s}\right)}. \qquad \text{Math 14}$$

$$N = \tau F_s. \qquad \text{Math 15}$$

$$B(\theta_s) = 1/N \sum_{i=0}^{N-1} X[n]e^{-j\left(\frac{\omega n}{F_s} + \frac{n|k||\vec{v}_r|\cos\theta_s}{F_s}\right)}. \qquad \text{Math 16}$$

In this disclosure, the beamformed output of the single-sensor Doppler-based measurement is compared to a 4-element USBL array (i.e., secondary array 129). The beampattern if the incident wave had zero phase difference across the "array" (e.g., the broadside case where $\theta_{rel}$=T/2), can be represented as illustrated in Math 17 and Math 18.

$$B_{Doppler}\left(\theta_{rel} = \frac{\pi}{2}; \theta_s\right) = 1/N \sum_{n=0}^{N-1} e^{-j\left(\frac{\omega n}{F_s} + \frac{n|k||\vec{v}_r|\cos\theta_s}{F_s}\right)}. \qquad \text{Math 17}$$

$$B_{USBL}\left(\theta_{rel} = \frac{\pi}{2}; \theta_s\right) = 1/M \sum_{i=0}^{M-1} e^{-j(|k|p[i]\cos\theta_s)}. \qquad \text{Math 18}$$

Where $\omega=2\pi f_s$, $|k|=2\pi f_s/c$, and M represents the number of hydrophones in the secondary array 129, and p the position of the elements in the array along a line. To further simplify handling of the Doppler beampattern, assuming A=1, it may be represented a repeating sinc function, similar to that of a uniform array: assuming the signal occurs at relative angle $\theta_{rel}$, and the incident signal is defined by Math 12 such that the beampattern is shown in Math 19. At broadside the time phase shift simply cancels out, and the remaining terms simplify to the form of a uniform line array, as illustrated in Math 20. Given that we are assuming a pulse length $\tau=N/F_s$, and for any $\theta_{rel}$ the equation becomes as shown in Math 21.

$$B_{Doppler}\left(\theta_{rel} = \frac{\pi}{2}; \theta_s\right) \qquad \text{Math 19}$$
$$= 1/N \sum_{n=0}^{N-1} e^{j\left(\frac{\omega n}{F_s} + \frac{n|k||\vec{v}_r|\cos\theta_{rel}}{F_s}\right)}$$
$$e^{-j\left(\frac{\omega n}{F_s} + \frac{n|k||\vec{v}_r|\cos\theta_s}{F_s}\right)}.$$

$$B_{Doppler}\left(\theta_{rel} = \frac{\pi}{2}; \theta_s\right) = \frac{\sin\left(\frac{N|k||\vec{v}_r|\cos\theta_s}{F_s}\right)}{\sin\left(\frac{|k||\vec{v}_r|\cos\theta_s}{F_s}\right)}. \qquad \text{Math 20}$$

$$B_{Doppler}(\theta_{rel}; \theta_s) = \frac{\sin(\tau|k||\vec{v}_r|(\cos\theta_s - \cos\theta_{rel}))}{\sin\left(\frac{\tau|k||\vec{v}_r|(\cos\theta_s - \cos\theta_{rel})}{N}\right)}. \qquad \text{Math 21}$$

This is equivalent to the beam response of uniform spatial array of length $|v_r|\tau$ and array element spacing of $|v_r|\tau/N$, thus the Doppler beam pattern can be analyzed in all of the same ways a conventional beampattern might be analyzed. A standard way of assessing resolution is with half power beamwidth (HPBW) which would occur for the function above as expressed in Math 22. If we let $u=\cos\theta_s$, we can calculate half power beamwidth for any steering directly as shown in Math 23; this results in a HPBW. For a source angle $\theta_{rel}$, this can be calculated as expressed in Math 24, where HPBW is the half power beamwidth in degrees or radians.

$$\tau |k||\vec{v}_r|(\cos \theta_s) = 1.4 \qquad \text{Math 22}$$

$$\Delta u = \frac{2.8}{(\tau |k||\vec{v}_r|)}. \qquad \text{Math 23}$$

$$\Delta \theta_{HPBW} = a\cos(\cos\theta_s - \Delta u) \qquad \text{Math 24}$$

Basis III-C) Doppler Versus USBL

As can be seen from these equations, the width of the Doppler beampattern (and consequential resolution in the beamformed output) will be dependent on the frequency $f_s$, the magnitude of the receiver velocity relative to the target ($|v_r|$ cos $\theta_{rel}$) and the length of the ping ($\tau$). FIGS. 3A-3N show the impact on the beampattern of the Doppler beampattern at broadside with varying relative speed and ping length: the greater the relative speed and ping length, the narrower the beamwidth. The impact on relative angle on beampattern given a 0.09 s long signal on a vehicle moving 1.5 m/s is also shown. In all cases, the Doppler result is compared to the secondary array 129 used in the field experiment described later in this disclosure.

These mathematical studies show some of the factors that affect the ability of Doppler-based angle resolution with a single hydrophone (receiver 122) to be effective. The length of the signal and speed affect the beamwidth; the sample rate effects the sidelobe level. A typical CPA pattern involves positive Doppler shifts on approach, and negative on departure. The relative velocity is greatest when the receiver is far from the target (i.e., tracked package 101), and at a minimum at CPA. This is similar to what is observed in standard arrays: "endfire" effects mean broader beam when the receiver is far from the source 102, with "broadside" effects at CPA when the relative velocity (and Doppler shift) are zero. An example of what this looks like is shown in FIGS. 4A-4M: the beamwidth is greatest at endfire (0 and 180 degrees) and narrowest at broadside (90 degrees).

Figure 5A:
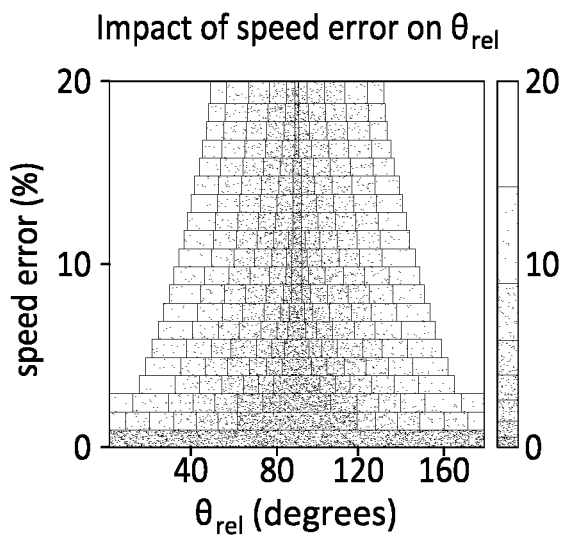
FIGS. 5A and 5B illustrate one example of the magnitude error in estimate of a relative angle $\theta_{rel}$ in degrees for errors in assumed speed $|v_r|$ of up to 20% in FIG. 5A, and instantaneous errors in heading of up to 100 in FIG. 5B. The impact of speed estimate errors on angle estimate is greatest near 0 and 180 degrees (i.e. along the direction of travel)
Figure 5B:
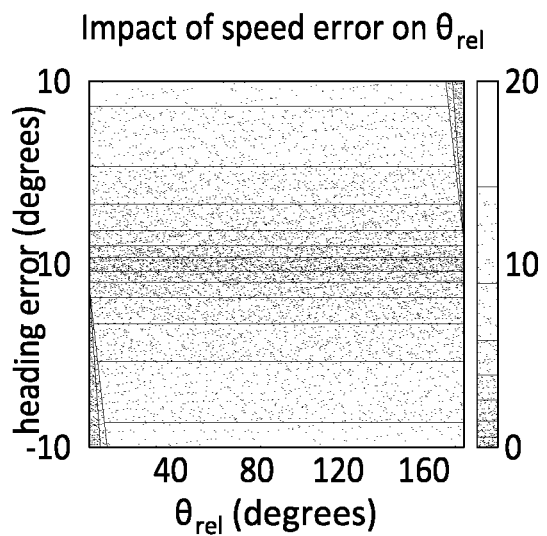

As a result of the nature of the Doppler-based beam estimation, whether Doppler or secondary array 129 (e.g., USBL) estimation will provide better resolution will be dependent on the virtual versus actual aperture length, motion in the array which will more negatively impact secondary array 129 (USBL) measurements, and accuracy of heading and own-ship velocity estimates. For these last factors, heading h and receiver speed $|v_r|$ are never perfectly known: there is always some error in these estimates. That error can be small (e.g. in cases of surface vehicles 121 with DVL bottom lock or AUVs 121 with DVL-aided INS) or large (e.g. for an underwater vehicle 121 with no INS or DVL). The impact of error in heading and speed on the estimate of $\theta_{rel}$ is shown in FIGS. 5A-5B. Speed has a larger impact than heading, with a 10% error in speed estimate resulting in 20 degrees of heading error when the receiver is moving directly towards the source. A lesser impact is found due to heading error. Some of the known/unknown techniques discussed in Basis III-A Section could be used to improve speed estimates in certain cases. The impact of speed error on bearing estimate is similar to mis-estimation of d or element spacing in a conventional line array (i.e., secondary array 129): at broadside, the estimate will be accurate, however the nearer to endfire, the greater the error in bearing estimate. In the cases of both a standard line array and the virtual array created by vehicle motion, left-right ambiguity is observed. The solution for that ambiguity is to use adaptations (i.e., a turn) to break the ambiguity associated with the bearing track.

Example Process

Figure 11:
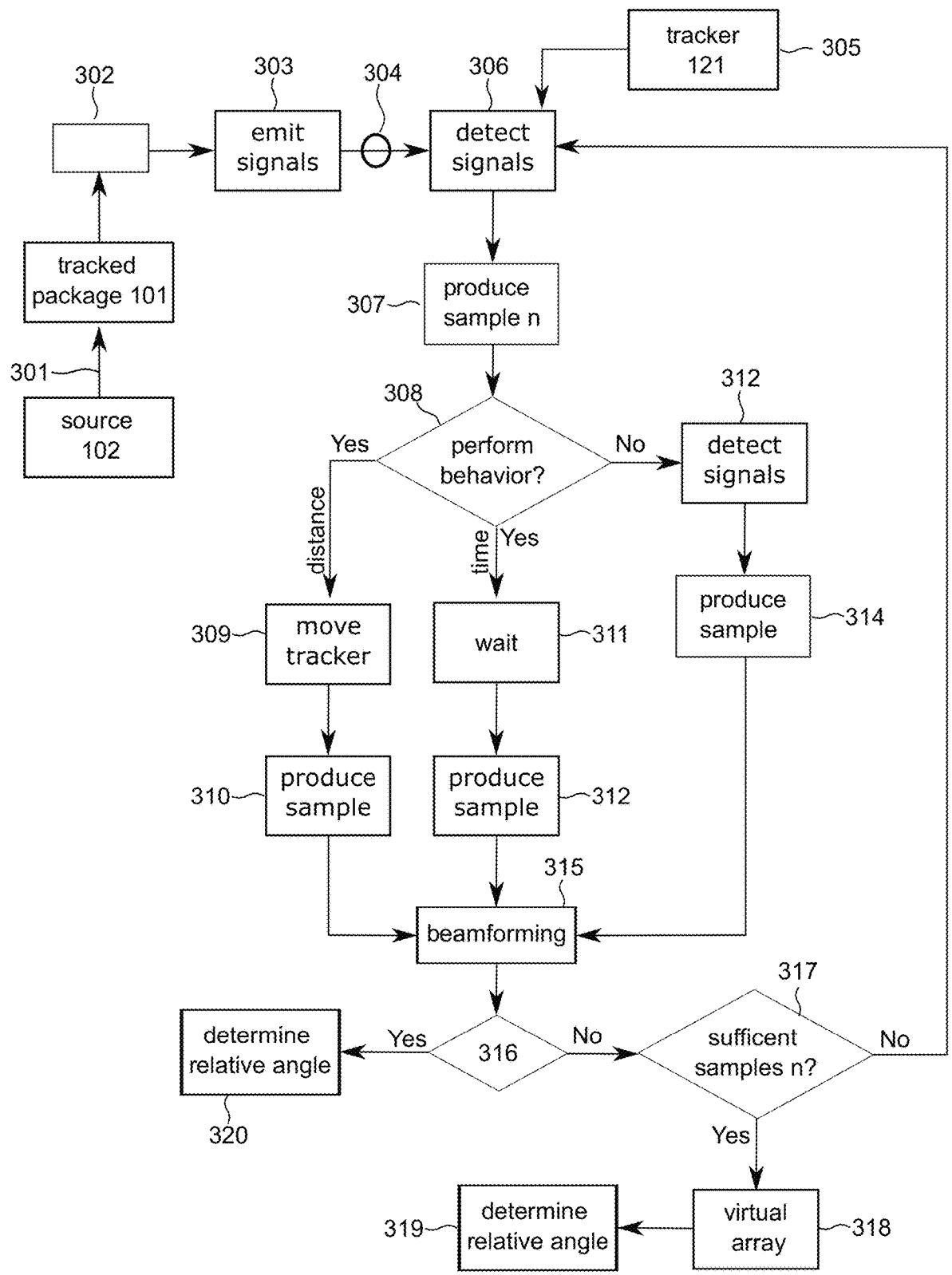
FIG. 11 is a schematic flowchart illustrating the operation of one embodiment of the present invention.

One method of use of the present invention utilizes a source 102 attached to a selected object of interest, i.e., the tracked object 101, illustrated in FIG. 11 by arrow 301. Alternatively, a tracked package may emit its own signals, or have a natural signal source. In either case, signals 103 are emitted into the environment as shown in FIG. 1A and illustrated as step 303, FIG. 11; box 302 represents, depending on the embodiment, either a tracked package-source combination, or an emitting tracked package 101. At least one tracker 121 comprising a receiver 122 is provided, step 305. The signals 103 (represented as circled arrow 304), from step 303 are then detected by the provided tracker 121 and its associated receiver 122, step 306. The receiver 122 produces sample n and the interconnected controller 124 processes sample n, step 307. In most embodiments, the receiver 122 receives a plurality of sample n, at a sampling frequency of $F_s$.

Between sample acquisition by receiver 122, the tracker 121 may perform different behaviors (for example, see FIGS. 2A-2G), decision step 308. In other words, the controller 124 may instruct a motor to operate a propeller or other thruster to alter the velocity and/or heading of the tracker 121. In one process, an embodied tracker 121 moves before producing another sample n from additional signals 103 detected in the environment Env with the receiver, step 309; this movement enables the controller 124 to produce a distance phase shift from the position difference between samples n, step 310. In other processes, an embodied tracker 121 waits a period of time before producing another sample n from additional signals 103, step 311; this time gap enables the controller 124 to produce a time phase shift from the position difference between samples n, step 312. In other processes, an embodied tracker 121 does not perform a behavior, but also detects additional signals 103, step 313, and produces a new sample n, step 314. The controller 124 may then preform beamforming analysis, step 315, on one or both, or neither (i.e., sample n from steps 313 and 314) of the distance phase shift and time phase shift.

In some embodiments, the tracker 121 does both movement and distance phase shift generation (steps 309 and 311) and waiting and time phase shift generation (steps 310 and 312). In some embodiments, the above steps 309 and 311 are done at the same time, as well as steps 310 and 312 are done at the same time. In some processes, an embodied tracker 121 does direct angle calculating (answering Yes to decision box 316 of direct calculation), and determines the relative angle to the source 102, step 320. In other processes, the tracker 121 does not perform direct calculation and only proceeds if sufficient (typically at least two) samples n are prepared for calculations; in these processes, the tracker 121 must determine if sufficient samples n are available for calculations, step 317. If not, the tracker 121 obtains additional signals 103 and samples n, by repeating the process at step 306. If there are sufficient samples n, then the controller 124 forms a virtual array of samples n, step 318, and determines a relative angle to the source 102, step 319. In some embodiments, the virtual array has samples n that are distance phase shifted. In other embodiments, the controller 124 forms a virtual array of samples n that are time phase shifted. And, like above, some embodiments form a virtual array of samples that are both time and distance phase shifted. In some embodiments, the controller 124 steers or iterates across a number of angles (steered angles) and beamforms at each steered angle. The controller 124 may then select the steered angle that has the maximum beampattern $\theta_s$ whereby the maximum beampattern represents the direction of the source 102.

Example of UXO Tracking

Presently, a specific example of one embodiment of the present disclosure will be presented in detail. One of the applications that Doppler and USBL based tracking has been used for is surrogate UXO (sUXO) tracking in the surf zone. Surrogate UXO are stainless steel cylinders with density and length similar to actual UXO that can be found at formerly used or active training ranges. In this example the sUXO is the tracked object 101. A sUXO 101 was deployed in the surf zone to measure the migration and burial of these objects during energetic wave forcing, as detailed in Traykovski, Peter, "Rapid Response Surveys of Mobility, Burial and Re-exposure of Underwater Munitions in Energetic Surf-Zone Environments and Object Monitoring Technology Development" https://www.serdp-estcp.org/Program-Areas/Munitions-Response/Munitions-Underwater/MR-2729/MR-2729/(language)/eng-US (2020), incorporated by referenced in its entirety herein.

Each sUXO 101 is equipped with a tether to a small surface buoy (10 cm long by 3 cm diameter) that can be manually tracked from a small boat with a handheld GPS sensor during very calm conditions in which the boat can launched. The sUXO 101 were deployed in 3 to 4 m water depth off the south coast of Martha's Vineyard, MA which is open to Atlantic Oceans waves from the south. During the deployment in October and November wave heights ranged from 0.5 m to 4.0 m as measured by a wave buoy in 13 m water depth. Acoustic pingers (in this example, the acoustic pingers are source 102) were located 1 m above each sUXO 101 on the buoy lines and were programmed to ping once per second with a 50 ms duration pulses on individual frequencies from 30 to 40 kHz with 1 kHz separation so that 11 different sUXO could be identified by the frequency.

The sUXO 101 are tracked by a surf-zone capable unmanned surface vessel (i.e. the tracker 121), which here is an electric jet drive propelled, self-righting, and completely submersible vehicle for use in breaking waves. The tracker vessel 121 had a single beam dual frequency (200/450 kHz) echosounder (here, serving as receiver 122) installed in the tracker's hull for bathymetry measurements, and a 10 cm long USBL for tracking the sUXO. The vessel also had phase resolving dual frequency (L1/L2) GPS system (i.e. the positioning mechanism 125) mounted on the tracker's deck for both heave compensation and position for the bathymetric measurements and speed and position (i.e., capable of generating velocity data) for the Doppler processing by on-board controller 124. The GPS data was processed in Post Processing Kinematic (PPK) mode with a base station on the shore to produce horizontal and vertical positions with several centimeters accuracy (2-3 cm horizontal, 3-5 cm vertical) and better than 3 cm/s velocity accuracy. The vessel was capable of operating in 1 to 1.5 m high intermittently breaking waves before and after the very energetic (~3 to 4 m high waves) that forced sUXO migration. Small manned boats are very difficult to operate in the 1 to 1.5 m high wave conditions due to complications in launching and landing through the swash zone, thus the ASV 121 provided several opportunities to survey both the bathymetry and sUXO 101 location in conditions that would not be possible with other techniques.

The ASV 121 also had a 4 element USBL 129 based on the maximum number of channels on the data recorder (i.e., integrated into controller 124) which were non-uniformly spaced to maximize the aperture according to minimum redundancy linear array (MRLA) design principles, as detailed in Moffet, A., "Minimum-redundancy linear arrays," published in IEEE Transactions on Antennas and Propagation, vol. 16, no. 2, pp. 172-175, March 1968, incorporated by referenced in its entirety herein. In this example, the elements were located at p=[−3:0 −2:0 0:9 3]d with p=0 being the center of the secondary array 129 and a spacing of d=0.016 m which is slightly smaller than $\lambda/2$=0.019 m at 40 kHz, due to constraint on the physical dimensions of a previously designed circuit board. Addition details on the data acquisition system can be found in Jaffre, Frederic M., et al. "Development of underwater acoustic backscatter and Doppler instruments from a small and versatile multi-frequency sonar board with software defined processing." published in OCEANS 2015-Genova, IEEE, 2015, incorporated by referenced in its entirety herein.

This MLRA array design of the secondary array 129 minimizes the width of the main beam with the first null at 18 degrees, but higher sidelobe amplitudes of −5.7 dB (FIG. 10) as compared to a uniformly sampled array with Nyquist element spacing:

$$p=[-1{:}5\ -0{:}5\ 0{:}5\ 1{:}5]d$$

with the first null at 44 degrees and sidelobe amplitudes of −11.3 dB.

In this example, data processing was done after deployment, referred herein as post-processing; however, in many embodiments, on-board controller 124 is enabled to perform processing in real-time. In post-processing the 24 Mhz sampled data (i.e., captured at a sample rate $F_s$ of 24 Mhz) that had been demodulated by a factor of 480 to 50 kHz during collection was demodulated by a series of frequencies in the range from −20 to −10 kHz separated by 1 kHz to search from transmissions from individual pingers (i.e., pingers 102 from each tracked object 101) and then filtered with a 200 Hz bandwidth filter to reject signals from the other pingers. Initial detection of received pings was performed by filtering the sum of the amplitude from the 4 channels with a 60 s duration boxcar train filter with 50 ms pulses 1 s apart based on the transmitted signal from the pingers. Peaks in the output of this filtering operation in a one-hour survey in the vicinity of the pingers, although some peaks were associated with low SNR receptions due to the long (60 s) ping detection filter.

Each 50 ms snapshot of data over the 4 channels ($\vec{x}=[\vec{x}_0, \vec{x}_1, \vec{x}_2, \vec{x}_3]'$) was first examined for Doppler shift since the ASV 121 was traveling at speeds of approximately V=0.5 to 2 m/s. Since the source velocity is known to be zero during the survey (it was non-zero in between surveys due to strong hydrodynamic forcing in storms) from embedded accelerometer measurements in the targets, and the demodulation post-processing step removes the source frequency, the received frequency can be described in terms of a Doppler shift from the receiver alone as defined by Math 3.

The Doppler spectra from the received data (x) is calculated as expressed in Math 25, where the $f_{ds}$ term is the Doppler steering frequency, related to the steering angle ($\theta_s$) in Math 26 and is varied to "steer" across possible bearings to the pinger.

This is similar to Math 19, except the source frequencies have been removed by demodulation in the field data processing (in this example, post-processing). A theoretical analytical solution with to Math 25 based on a uniform pulse of length with N samples was defined in the previous section by Math 21.

Figure 6A:
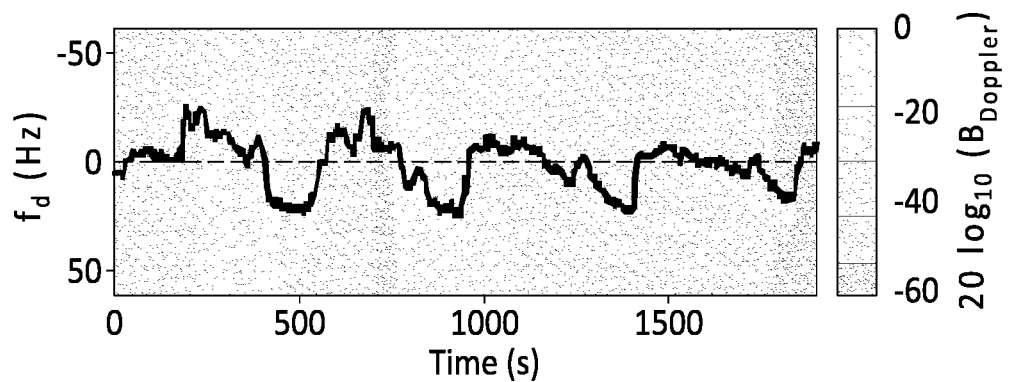
FIGS. 6A and 6B illustrate one example of the Doppler shift of pings received on the secondary array; greyscale intensity represents the magnitude of $B_{Doppler}$, the line is a time series of the peak of the Doppler spectra.
Figure 6B:
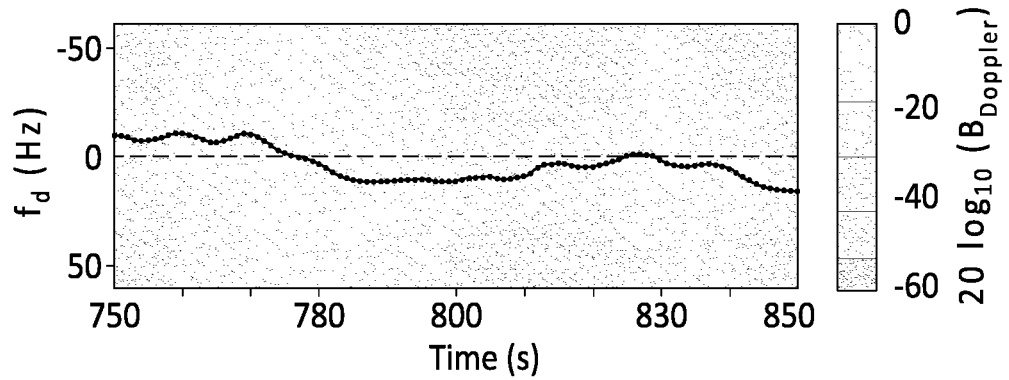

The Doppler spectra is calculated from the data via Math 25 can be used to examine the frequency shift of the signal before subsequent beamforming operations, as illustrated in FIGS. 6A-6B, and can also be represented in angle space in terms of values of $\theta_s$. For calculations with real data, a vector of $f_{ds}$ values from −60 Hz to 60 Hz with 1 Hz increments was used. The limits of the range match the maximum Doppler shift possible during the experiment with vehicle 121 speeds of up to 2 m/s. The Doppler shift from positive to negative is clearly seen in FIGS. 6A-6B as the ASV 121 passes the target at t=773 s, representing a subsequent change in angle.

Figure 7A:
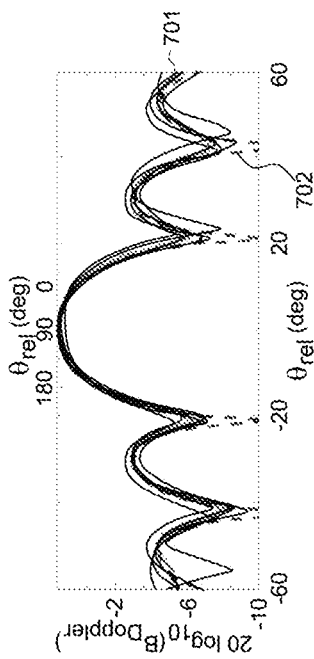
FIG. 7A illustrates one example of the Doppler shift spectra for 5 pings near the tracked package 101 (t=771 to 775 s, thin grey lines) and average of the 5 pings (thick line 701) plotted vs Doppler Shift Frequency ($f_d$). The angular coordinates transformed from Doppler shift via Math 25 is shown above the plot on the upper x-axis. Theoretical spectra from a uniform pulse using frequency domain theory is shown as a black dotted line 702. All spectra are shifted to have peaks at $f_d$=0.
Figure 7B:
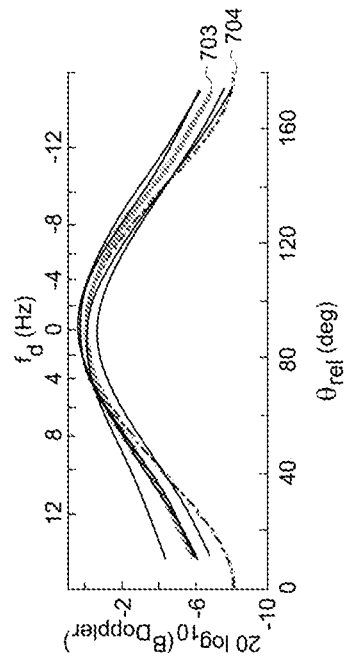
FIG. 7B illustrates one example of the Doppler shift beam patterns for 5 pings near the tracked package 101 (t=771 to 775 s, thin grey lines) and average of the 5 pings (thick line 703) using spatial domain theory. Theoretical beam patterns from a uniform pulse is shown as a black dotted line 704.

The structure of the Doppler spectra $B_{Doppler}(f_{ds})$ was examined as the ASV 121 passes the targets 101 for ping receptions (i.e., receiving signals 103 in the environment ENV) from t=771 through 775 seconds. The five Spectra were shifted to have peaks at zero frequency and averaged to reveal a spectral response that is consistent with the theoretical predictions described in Math 21 for the uniform time sampling of the pings, as illustrated in FIGS. 7A-7B. The Doppler shift axis can be transformed to angular space using Math 26 and thus the response can viewed as beam pattern, illustrated in FIG. 7B.

In Math 26 the average ASV 121 speed from t=771 through 775 second of $v_{avg}$=0.6 m/s was used the transformation. This relatively slow speed results in a maximum peak Doppler Shift of $f_s v_{avg}/c$=13.4 Hz, and a relatively wide beam pattern with the entire main lobe contained within the 180-degree symmetry window of the beam pattern. The width of the beam pattern is consistent the "virtual array" spatial extent of signal reception $v_{avg}\tau$=2.9 cm.

To estimate bearing to the pinger ($\theta_{rel}$) from this beamformed output, the maximum value of $B_{Doppler}$ is used to find estimated Doppler shift $\tilde{f}_d$ as expressed in Math 27. This estimated Doppler shift is then used to estimate $\tilde{\theta}_{rel}$ as expressed in Math 28, where $|v_r|$ is the magnitude of the GPS-determined velocity vector, which is determined accurately by PPK GPS.

$$\tilde{f}_d = \mathrm{argmax}_{f_{ds}} B_{Doppler}.$$ Math 27

$$\tilde{\theta}_{rel} = \arccos \frac{c\tilde{f}_d}{f_s|v_r|}$$ Math 28

Figure 8A:
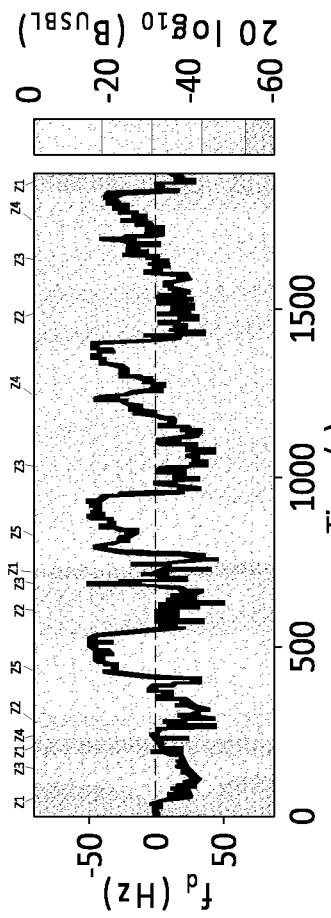
FIGS. 8A and 8B illustrate one example of beamforming of the pings received on the secondary array 129 (here a USBL array) after Doppler compensation. The greyscale intensity represents the magnitude of $B_{USBL}$; the line is a time series of the peak of the beamformer angular spectra.
Figure 8B:
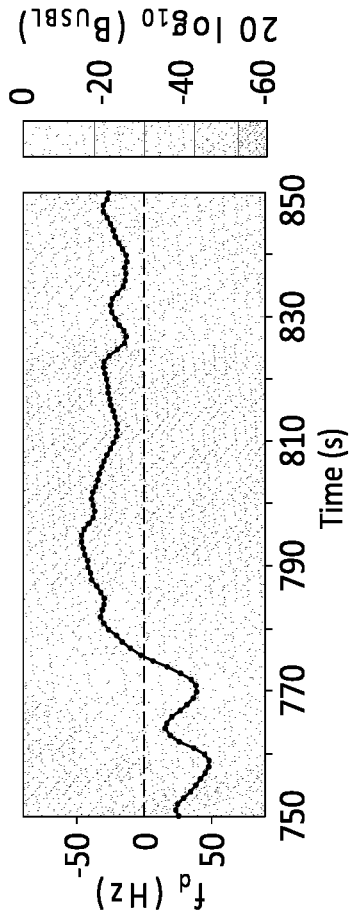

A similar calculation is conducted for secondary array 129 (e.g., USBL) bearing estimation post Doppler compensation, where $\vec{X}_i(f_r)$ represents the Fourier-transformed signal at frequency $f_r$ with sample snapshot length N in Math 29, where $\theta_s$ is varied from 0 to 180 degrees since the beam pattern is symmetric on either side of the line array of the secondary array 129. The shift in beam angle from negative to positive, passing through broadside is clearly seen as the ASV 121 passes the target at t=788 s, as illustrated in FIG. 8A-8B. The estimate of bearing is found at the maximum of this beampattern in Math 30.

$$B_{USBL}(\theta_s) = \sum_{i=o}^{i=3} X_i[f_r] e^{-j2\pi f_r p[i]\cos\theta_s/c}$$ Math 29

$$\tilde{\theta}_{rel} = \mathrm{argmax}_{\theta_s}(B_{USBL})$$ Math 30

A theoretical solution to Math 29 can be found by using the Fourier transform of a uniform pulse of length $\tau$ for $X_i[f_r]$ (FIG. 10A). The Doppler spectra has much better side lobe performance than the secondary array 129 USBL response due to choice of MRLA array for the USBL secondary array 129 which maximizes aperture (minimizes beam width) at the expense of higher side lobe levels. At a receiver speed of $|v_r|$=2 m/s the synthetic aperture of the Doppler with the 50 ms pings would be 0.10 m, so almost the same as physical length of the array (0.09 m); however, in this survey the ASV 121 was travelling 0.6 m/s it passed the target resulting in a synthetic (Doppler) aperture of ⅓ the physical aperture of the array.

As described in Basis III-A Section elsewhere herein, the Doppler and beamforming measurements can be transformed into a bearing relative to the vessel by using the by using the ASV's velocity and heading. The results for USBL or Doppler beamforming can be transformed into a geographic Cartesian bearing in Math 31 where $\theta_r$=arctan($u_r/v_r$) is the velocity angle and $u_r$, $v_r$ are the easterly and northerly components of the positioning mechanism 125 (e.g., GPS) measured vessel velocity $\vec{v}_r$.

This measurement of velocity heading is independent of the vessel heading and is a higher quality measurement than the vessel heading due to the accuracy of the PPK GPS method for velocity heading relative to the accuracy of the low cost IMU in the pixhawk for vessel heading. The USBL 129 bearing spectra $B_{USBL}(\theta_s)$ can be transformed similarly to estimate a geographic cartesian angle $\theta_g$ as illustrated in Math 32, where $\theta_{IMU}$ is the heading from the ASV's pixhawk IMU, which is based on a Extended Kalman Filter (EKF) fusion of magnetometer, accelerometer, gyroscope and lower resolution code resolving GPS data (velocity data and position data).

$$\theta_{dg} = \tilde{\theta}_{rel} + \theta_r$$ Math 31

$$\theta_{sg} = \theta_s + \theta_{IMU}$$ Math 32

These directional spectral estimates can be centered on the vessel's position for each ping reception and then multiple receptions with different positions can be combined to estimate the target location via triangulation (most often involving distance phase shift).

For an individual reception the USBL directional spectra is transformed to a spatial pattern $G_{USBL}(x_g, y_g)$ describing the Doppler beam pattern on a fixed $x_g$, $y_g$ grid to enable binned plotting as Math 33, where R is expressed in Math 34 and $\theta_{sg}$ is expressed in Math 35.

$$G_{USBL}(x_g, y_g) = B_{USBL}(\theta_{sg})/(R+R_n)$$ Math 33

$$R = \sqrt{(x_g + x_{GPS})^2 + (y_g + y_{GPS})^2}$$ Math 34

$$\theta_{sg} = \arctan(x_g + x_{GPS})/(y_g + y_{GPS}).$$ Math 35

The addition of $R_n$=3, a range offset in meters introduced in Math 33, prevents singularities at the vessel 129 location and compensates for near field beam processes. The gridded Doppler direction spectra along with the path of the ASV 121 for a single reception near the location where the ASV 121 is broadside to a target (i.e. tracked package 101), as shown in FIG. 9A.

To estimate the position of the target, the gridded beam pattern from all pings receptions is summed. The peak of this sum is the position estimate. This bearing only estimate of position effectively triangulates the location of the target from multiple bearing estimates FIG. 9B. Similar calculations can be performed for the USBL based gridded beam patterns.

Embodiments with both Doppler-capable components (i.e., source 102 and receiver 122), as well as a secondary array 129, a combined estimated location can be calculated. A combined solution is obtained by summing the Doppler-based beam gridded patterns and the USBL-based gridded beam patterns and estimating the position of the targets from the peak sum of the gridded solutions. Position estimates for the combined Doppler and USBL solutions, Doppler only and USBL only were compared to GPS locations of small buoys attached to the target, which may vary from the actual position by up to 5 m due to buoy line scope FIG. 10B. The root mean squared (RMS) error between the combined USBL and Doppler estimates with the GPS Buoy measurements is 3.9 m and the 85th percentile is 5 m. Based on these error magnitudes this technique is suitable for measuring large scale migration of the UXO on scales of sand bar and surf zone with accuracy of about 100 m, but cannot measure small position and orientation changes on the scale of the objects themselves (1 m) as the object roll or shift near the threshold of motion. Similarly, this technique could be used to home in on a target in a kilometers-large error, using motion of a vehicle to localize the target or remain near the target.

In conclusion, this disclosure describes a method for estimating bearing to a known-frequency sound source from a single hydrophone on a moving vessel by equating the phase shift due to vessel motion with array phase-shift. The resulting Doppler estimated bearing and corresponding filtered position has multiple applications, and was demonstrated for localization of pinger-marked UXOs in a surf zone. Utilizing a beamforming methodology on Doppler measurements has the potential to extend the localization capabilities of localization systems with single transducers (e.g. two-way acoustic modem systems), or to further improve the resolution of small arrays by simultaneously accounting for phase shifts of both element move-out and vehicle motion-induced move-out. While this method is dependent on knowledge of own-ship velocity for full localization, additional estimation steps with a fixed target may be used to provide improved estimates of that velocity; on surface vessels, velocity can also be estimated well via GPS and IMU measurements for localization of submerged targets. Formulating the Doppler relative bearing estimate as a beamforming process opens up the technique to application of optimal and adaptive array processing methods for improved resolution and performance versus noise.

Although specific features of the present disclosure are shown in some drawings and not in others, this is for convenience only, as each feature may be combined with any or all of the other features in accordance with the disclosure. While there have been shown, described, and pointed out fundamental novel features of the disclosure as applied to a preferred embodiment thereof, it will be understood that various omissions, substitutions, and changes in the form and details of the devices illustrated, and in their operation, may be made by those skilled in the art without departing from the spirit and scope of the disclosure. For example, it is expressly intended that all combinations of those elements and/or steps that perform substantially the same function, in substantially the same way, to achieve the same results be within the scope of the disclosure. Substitutions of elements from one described embodiment to another are also fully intended and contemplated. It is also to be understood that the drawings are not necessarily drawn to scale, but that they are merely conceptual in nature.

It is to be understood that the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on, or executable by, a programmable computer including any combination of any number of the following: a processor, a storage medium readable and/or writable by the processor (including, for example, volatile and non-volatile memory and/or storage elements), an input device, and an output device. The input device and/or the output device form a user interface in some embodiments. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention obtains multiple signal samples and forms a virtual array, automatically updating data in an electronic memory representing such values and transmitting such data for storage and processing. Such features can only be performed by computers and other machines and cannot be performed manually or mentally by humans.

Any claims herein which affirmatively require a computer, a processor, a controller, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a controller, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors.

Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays).

A computer can generally also receive (read) programs and data from, and write (store) programs and data to, a non-transitory computer-readable storage medium such as an internal disk (not shown) or a removable disk or flash memory. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium or other type of user interface. Any data disclosed herein may be implemented, for example, in one or more data structures tangibly stored on a non-transitory computer-readable medium. Embodiments of the invention may store such data in such data structure(s) and read such data from such data structure(s).

It is the intention, therefore, to be limited only as indicated by the scope of the claims appended hereto. Other embodiments will occur to those skilled in the art and are within the following claims.

What is claimed is:

1. A combination of a vessel and a non-transient computer readable medium containing program instructions for causing a computer in the vessel to perform a method, the method comprising:
    selecting a vessel configured to move on water and/or underwater, the vessel having the computer with the computer readable medium, having a propulsor capable of providing a motive force to move the vessel at a velocity on water and/or underwater, and having a receiver with a single hydrophone;
    receiving, from the receiver, over time a plurality of samples n, each sample of said plurality of samples having a received frequency $f_r$ and originating from a selected source emitting signals into an underwater environment, said signals having a source frequency $f_s$;
    generating a first vessel velocity magnitude $|v_r|$;
    forming a virtual array with a first sample and a second sample of said plurality of samples n, said first sample having a first received frequency and said second sample having a second received frequency; and
    determining a relative angle to said source from said receiver using said source frequency $f_s$, said virtual array including said first received frequency and said second received frequency, and said first vessel velocity magnitude $|v_r|$ to provide an estimate of location of the selected source in the underwater environment.

2. The non-transient computer readable medium in the combination of claim 1 wherein said plurality of samples n are received from only the single hydrophone in the receiver.

3. The non-transient computer readable medium in the combination of claim 1 wherein said first vessel velocity magnitude $|v_r|$ is determined by a position module.

4. The non-transient computer readable medium in the combination of claim 1 wherein said first vessel velocity magnitude $|v_r|$ is determined by an underwater positioner.

5. The non-transient computer readable medium in the combination of claim 1, wherein said plurality of samples n are assumed to have a constant waveform ping with said source frequency $f_s$, and a constant pulse duration $\tau$, and said determining said relative angle further uses said constant waveform ping and said constant pulse duration.

6. The non-transient computer readable medium in the combination of claim 5, wherein said receiver receives said plurality of samples n at a sampling rate of $F_s$.

7. The non-transient computer readable medium in the combination of claim 6, wherein said first vessel velocity magnitude $|v_r|$ is not zero.

8. The non-transient computer readable medium in the combination of claim 6, further comprising the steps of:
    generating a second vessel velocity magnitude $|v_r|$.

9. The non-transient computer readable medium in the combination of claim 8 further comprising the steps of:
    calculating a time phase shift from the time difference between the sampling time of said first and said second sample of said plurality of samples n;
    calculating a distance phase shift from the position difference between said first vessel velocity magnitude $|v_r|$ and said second vessel velocity magnitude $|v_r|$; and
    wherein said determining said relative angle further includes beamforming said time phase shift and said distance phase shift.

10. The non-transient computer readable medium in the combination of claim 9, wherein said beamforming produces a maximum beampattern $\theta_s$ that corresponds to the direction of incidence $\theta_{rel}$.

11. A system of Doppler-based relative angle resolution to track a selected package, the system comprising:
    a tracked package including a source configured to produce signals capable of traveling through an underwater environment Env, said signals having a source frequency $f_s$;
    a tracker including a vessel configured to move on water and/or underwater, the vessel having a propulsor capable of providing a motive force to move the vessel at a velocity on water and/or underwater, having a receiver with a single hydrophone, having a position module and having a controller connected to the receiver;
    wherein said receiver is configured to receive said signals and produce a plurality of samples n, each sample of said plurality of samples having a received frequency $f_r$;

wherein said tracker has a first vessel velocity magnitude $|v_r|$ that is generated by one of said position module and said controller;

wherein said controller is configured form a virtual array with a first sample and a second sample of said plurality of samples n, said first sample having a first received frequency and said second sample having a second received frequency; and wherein said controller is further configured to determine a relative angle to said source from said receiver using said virtual array including said first received frequency and said second received frequency, said source frequency $f_s$, and said first vessel velocity magnitude $|v_r|$ to provide an estimate of location of the tracked package in the underwater environment.

12. The system of Doppler-based relative angle resolution of claim 11, wherein said source produces signals having a constant waveform ping with said known signal source frequency $f_s$, and a constant pulse duration τ.

13. The system of Doppler-based relative angle resolution of claim 11, wherein said first vessel velocity magnitude $|v_r|$ is not zero.

14. The system of Doppler-based relative angle resolution of claim 13, wherein said controller is further configured to receive a second vessel velocity magnitude $|v_r|$, to calculate a time phase shift from the time difference between the sampling time of said first sample and said second sample of said plurality of samples, and to calculate a distance phase shift from the position difference between said first vessel velocity magnitude and said second vessel velocity magnitude; and wherein said controller's configuration to determine said relative angle further includes beamforming said time phase shift and said distance phase shift.

15. The system of Doppler-based relative angle resolution of claim 14, wherein said beamforming produces a maximum beampattern $\theta_s$ that corresponds to the direction of incidence $\theta_{rel}$.

16. A method of Doppler-based relative angle resolution to track a selected source, the method comprising the steps of:

selecting a tracked package including a source configured to produce signals having a source frequency $f_s$ capable of traveling through an underwater environment Env;

selecting a tracker including a vessel configured to move on water and/or underwater, the vessel having a propulsor capable of providing a motive force to move the vessel at a velocity on water and/or underwater, having a receiver with a single hydrophone, having a position module and having a controller connected to the receiver, wherein said receiver is configured to receive signals traveling through the underwater environment Env, wherein said tracker has a first vessel velocity magnitude $|v_r|$ that is generated by one of said position module and said controller;

receiving, with said receiver, said signals, thereby producing a first sample having a first received frequency $f_r$ and a second sample having a second received frequency $f_r$;

generating said first vessel velocity magnitude $|v_r|$;

forming a virtual array with said first sample and said second sample; and determining a relative angle to said source from said receiver using said signal source frequency $f_s$, said virtual array including said first received frequency and said second received frequency, and said first vessel velocity magnitude $|v_r|$ to provide an estimate of location of the selected source in the underwater environment.

17. The method of Doppler-based relative angle resolution of claim 16 wherein said first vessel velocity magnitude is not zero and the method further includes the step of receiving a second vessel velocity magnitude $|v_r|$.

18. The method of Doppler-based relative angle resolution of claim 17 wherein said position module generates and sends said first vessel velocity magnitude and said second vessel velocity magnitude $|v_r|$ to said controller.

19. The method of Doppler-based relative angle resolution of claim 17 further comprising the steps of:

calculating, with said controller, a time phase shift from the time difference between the sampling time of said first sample and said second sample of said plurality of samples n;

calculating, with said controller, a distance phase shift from the position difference between said first vessel velocity magnitude $|v_r|$ and said second vessel velocity magnitude $|v_r|$; and wherein said determining said relative angle further includes beamforming said time phase shift and said distance phase shift.

20. The combination of claim 1 wherein the vessel is one of an autonomous underwater vehicle or an autonomous surface vehicle.

* * * * *